United States Patent
Maschmeyer et al.

(10) Patent No.: US 12,266,068 B2
(45) Date of Patent: Apr. 1, 2025

(54) SYSTEM AND METHOD FOR UPDATING ELECTRONIC CONTENT BY SELECTIVELY REPLACING VIRTUAL 3D OBJECTS

(71) Applicant: Shopify Inc., Ottawa (CA)

(72) Inventors: Russ Maschmeyer, Berkeley, CA (US); Brennan Letkeman, Calgary (CA)

(73) Assignee: Shopify Inc., Ottawa (CA)

( * ) Notice: Subject to any disclaimer, the term of this patent is extended or adjusted under 35 U.S.C. 154(b) by 184 days.

(21) Appl. No.: 17/821,211

(22) Filed: Aug. 22, 2022

(65) Prior Publication Data

US 2023/0401802 A1 Dec. 14, 2023

Related U.S. Application Data

(60) Provisional application No. 63/366,352, filed on Jun. 14, 2022.

(51) Int. Cl.
| | |
|---|---|
| *G06T 19/20* | (2011.01) |
| *G06F 3/04883* | (2022.01) |
| *G06Q 30/06* | (2023.01) |
| *G06Q 30/0601* | (2023.01) |
| *G06T 19/00* | (2011.01) |
| *G06F 3/0482* | (2013.01) |

(52) U.S. Cl.
CPC ......... *G06T 19/20* (2013.01); *G06F 3/04883* (2013.01); *G06Q 30/0643* (2013.01); *G06T 19/006* (2013.01); *G06F 3/0482* (2013.01); *G06T 2200/24* (2013.01); *G06T 2210/04* (2013.01); *G06T 2219/2004* (2013.01); *G06T 2219/2016* (2013.01)

(58) Field of Classification Search
CPC .............. G06T 19/20; G06T 19/006; G06T 2200/24; G06T 2210/04; G06T 2219/2004; G06T 2219/201; G06T 2219/2024; G06F 3/04883; G06F 3/0482; G06F 3/04815; G06F 3/04842; G06F 3/04845; G06Q 30/0643
See application file for complete search history.

(56) References Cited

U.S. PATENT DOCUMENTS

| | | | |
|---|---|---|---|
| 11,003,308 B1 * | 5/2021 | Dryer | G06T 7/55 |
| 11,508,166 B2 * | 11/2022 | Kim | G06V 20/64 |
| 2008/0071559 A1 * | 3/2008 | Arrasvuori | G06F 3/011 |
| | | | 705/26.1 |
| 2012/0210255 A1 * | 8/2012 | Ooi | G06T 19/006 |
| | | | 715/762 |

(Continued)

*Primary Examiner* — Michael Le
(74) *Attorney, Agent, or Firm* — CPST Intellectual Property Inc.; Brett J. Slaney

(57) ABSTRACT

A system and method are provided for updating electronic content by selectively replacing virtual 3D objects being displayed in an electronic environment. The method includes in one example, presenting augmented reality (AR) content, the presented AR content showing a set of objects, at least some of the objects of the set of objects being rendered 3D objects; receiving an input identifying one of the objects of the set of objects; and responsive to the input, providing updated AR content, the updated AR content replacing at least one of the objects with a different rendered 3D object, wherein the replaced at least one of the objects is determined based on the identified one of the objects of the set of objects.

23 Claims, 23 Drawing Sheets

(56) References Cited

U.S. PATENT DOCUMENTS

| | | | |
|---|---|---|---|
| 2019/0197785 A1* | 6/2019 | Tate-Gans | G06T 19/006 |
| 2019/0228581 A1* | 7/2019 | Dascola | G06F 3/04886 |
| 2019/0370544 A1* | 12/2019 | Wright, Jr. | G06Q 10/20 |
| 2020/0117335 A1* | 4/2020 | Mani | G06F 9/452 |
| 2022/0058882 A1* | 2/2022 | Paul | G06F 3/04886 |
| 2022/0076323 A1* | 3/2022 | Angeli | G06Q 30/0205 |
| 2022/0092857 A1* | 3/2022 | Haapoja | G06N 20/00 |
| 2022/0319058 A1* | 10/2022 | Skidmore | G06T 7/70 |
| 2023/0177832 A1* | 6/2023 | Besecker | G06F 3/011 345/633 |

* cited by examiner

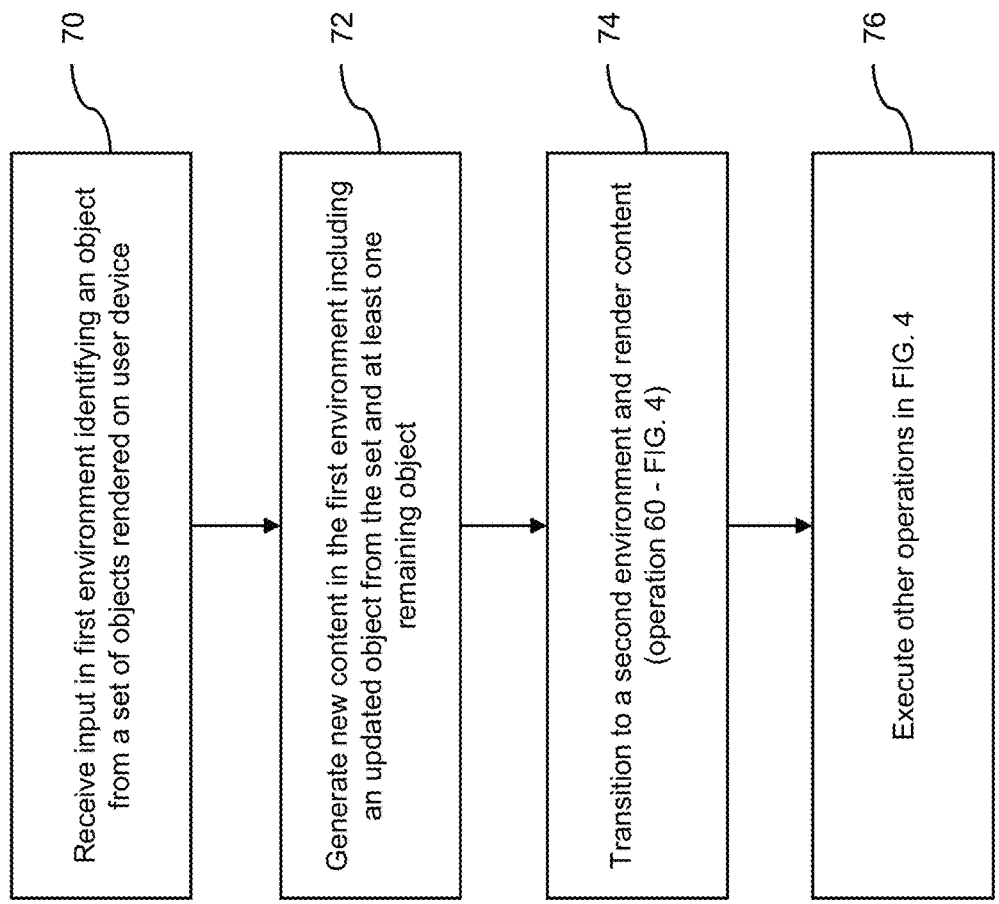

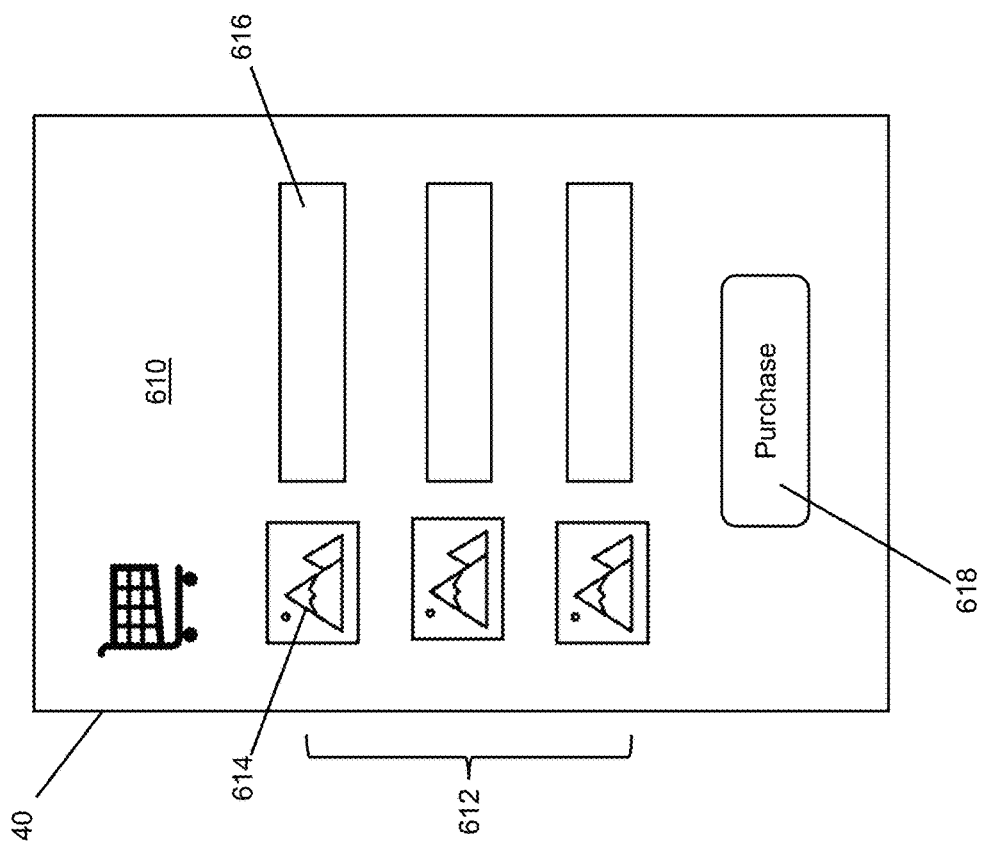
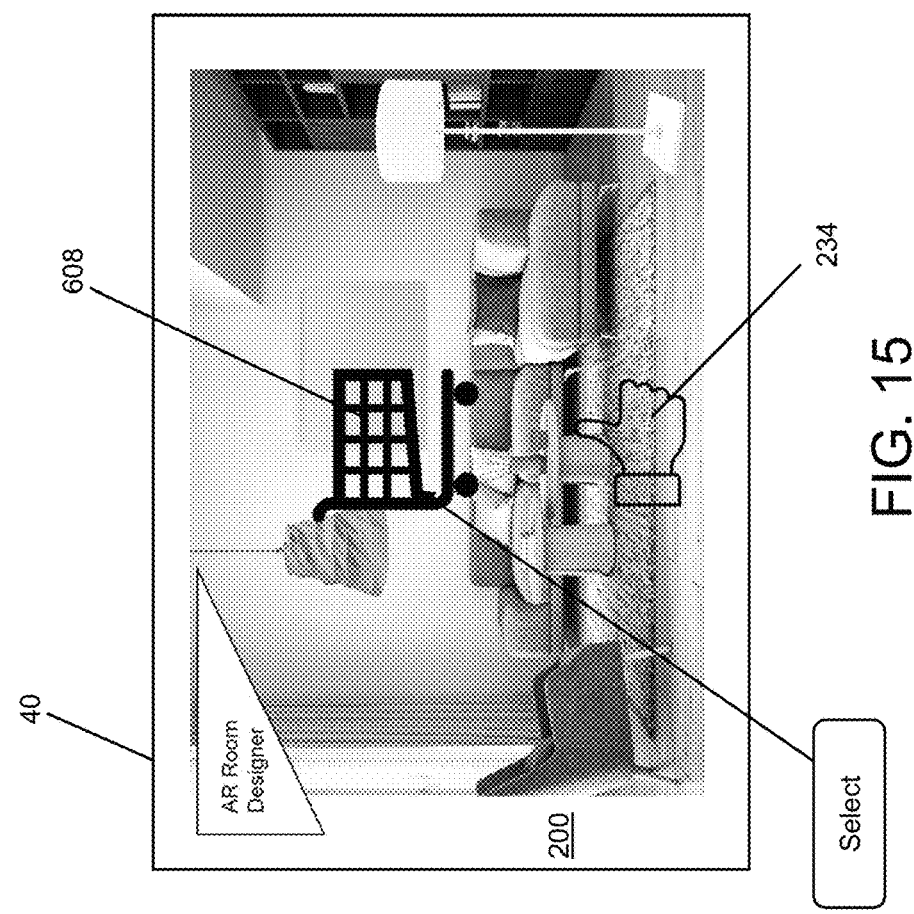
FIG. 16
FIG. 15

SYSTEM AND METHOD FOR UPDATING ELECTRONIC CONTENT BY SELECTIVELY REPLACING VIRTUAL 3D OBJECTS

CROSS REFERENCE TO RELATED APPLICATION(S)

This application claims priority to U.S. Provisional Patent Application No. 63/366,352 filed on Jun. 14, 2022, the contents of which are incorporated herein by reference in their entirety.

TECHNICAL FIELD

The following relates generally to updating electronic content and, in particular, to updating such electronic content by selectively replacing virtual 3D objects being displayed in an electronic environment.

BACKGROUND

Augmented reality (AR) and virtual reality (VR) environments are increasingly used to view or preview objects in a scene, which can range from a mix of real-world and virtual objects in AR applications to entirely virtual objects in VR environments.

BRIEF DESCRIPTION OF THE DRAWINGS

Embodiments will now be described with reference to the appended drawings wherein:

FIG. 5 is a flow chart illustrating an example set of computer executable instructions that can be executed for updating electronic content in a first environment and transitioning to a second environment to further update the electronic content.

FIG. 8b shows the 2D room designer UI following replacement of objects selected in the view shown in FIG. 8a.

FIG. 15 shows the AR room designer following a confirmation input and providing a checkout mechanism.

FIG. 16 shows an example of a checkout UI showing a list of items based on objects displayed upon selecting the checkout mechanism in FIG. 15.

DETAILED DESCRIPTION

Figure 1:
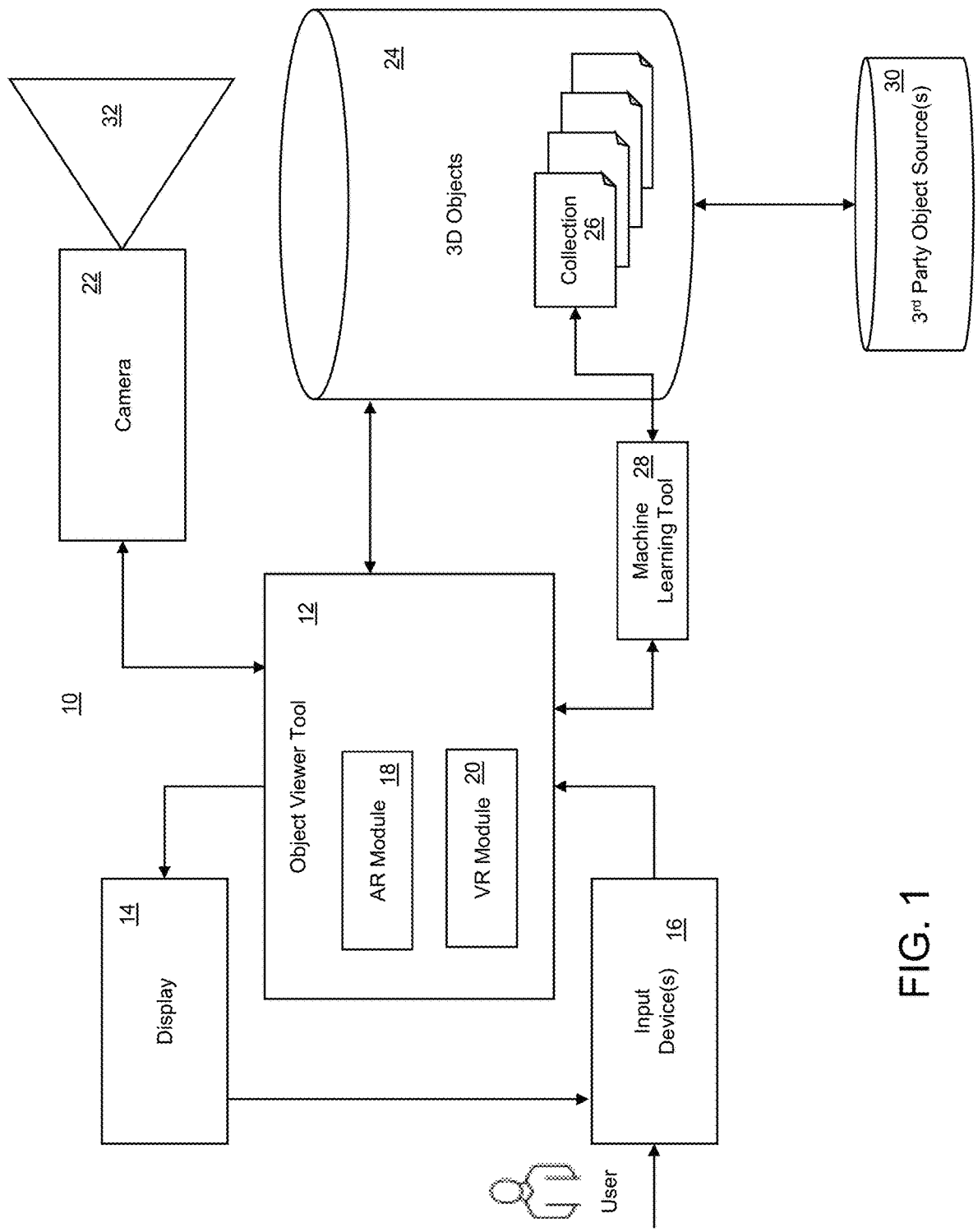
FIG. 1 is an example of a computing environment in which electronic content is updated by selectively replacing virtual 3D objects being displayed in an electronic environment.

Buyers may preview product curations using AR within a real-world setting. Curations may include multiple virtual 3D models of products sold by one or more merchants. As a specific example, a curation related to interior design can include a couch, a rug and a coffee table. The buyer may want to envision these products in their living room and thus an AR tool would allow the curation to be viewed in the real-world room, potentially alongside existing furniture and within the features of that room (e.g., ceiling height, window size and placement, doorways, etc.).

The buyer may want the ability to preview different options by mixing and matching items from different curations. For example, the buyer may want to preview a couch and a rug from curation "A" with the coffee table from curation "B". Additionally, the buyer may want to replace all objects in the arrangement or only specific items. Moreover, they may want the next object to respect the existing arrangement, for instance by maintaining the type of item and maintaining the position of the next object relative to the room or relative to other virtual 3D objects in the scene.

Considering the above, there are certain challenges with swapping or otherwise changing objects in an AR or VR environment. One challenge is that the buyer may be required to enter separate inputs (e.g., touch gestures such as a swipe) for each item that they wish to replace. This can be a slow and cumbersome experience that introduces friction in the process. Another challenge is that while another type of input may be available to replace or remove multiple objects at a time, this type of input may be limited to replacing everything in the scene (or field of view), including objects that the buyer would actually like to keep (and only replace some (or all) others around it). That is, certain inputs may not have the desired effect when a complete replacement or swap is not desired or if the desired gesture becomes too difficult to capture the intended set of replacements.

Enabling a user to replace or lock multiple virtual 3D models in a scene with one or more particular inputs (e.g., tap/touch and/or swipe gestures), while allowing them to exercise control over the objects being replaced or locked may be desirable. The following provides a system that allows a user to identify and lock one or more objects in a scene or environment and then proceed to apply a change (such as a replacement, rotation, shuffle, etc.) to at least one other object in the scene or environment while maintaining the locked object(s). In this way, the user can replace or otherwise change a collection of objects in the scene in a stepwise or otherwise selective manner by locking in desired objects when appropriate, while permitting convenient changes to objects in the collection that are not locked.

In one aspect, there is provided a computer-implemented method, comprising: presenting AR content, the presented AR content showing a set of objects, at least some of the objects of the set of objects being rendered 3D objects; receiving an input identifying one of the objects of the set of objects; and responsive to the input, providing updated AR content, the updated AR content replacing at least one of the objects with a different rendered 3D object, wherein the replaced at least one of the objects is determined based on the identified one of the objects of the set of objects.

In another aspect, there is provided a system comprising at least one processor and at least one memory. The at least one memory includes computer executable instructions that, when executed by the at least one processor, cause the system to present AR content, the presented AR content showing a set of objects, at least some of the objects of the set of objects being rendered 3D objects; receive an input identifying one of the objects of the set of objects; and responsive to the input, provide updated AR content, the updated AR content replacing at least one of the objects with a different rendered 3D object, wherein the replaced at least one of the objects is determined based on the identified one of the objects of the set of objects.

In another aspect, there is provided a computer readable medium comprising computer executable instructions that when executed by a processor, cause the processor to execute instructions comprising: presenting AR content, the presented AR content showing a set of objects, at least some of the objects of the set of objects being rendered 3D objects; receiving an input identifying one of the objects of the set of objects; and responsive to the input, providing updated AR content, the updated AR content replacing at least one of the objects with a different rendered 3D object, wherein the replaced at least one of the objects is determined based on the identified one of the objects of the set of objects.

In certain example embodiments, the method can include receiving a further input; and based on the input and the further input, replacing the at least one of the objects with the different rendered 3D object. The further input can include a swipe gesture.

In certain example embodiments, the input is a lock input.

In certain example embodiments, the input is an unlock input.

In certain example embodiments, the replaced at least one of the objects can correspond to the one of the objects identified by the input.

In certain example embodiments, the replaced at least one of the objects can correspond to one or more objects other than the one of the objects identified by the input.

In certain example embodiments, the different rendered 3D object can include at least one new rendered 3D object in replacement of the replaced at least one of the objects.

In certain example embodiments, a position of the different rendered 3D object can be offset from a particular location of the one of the objects identified by the input.

In certain example embodiments, at least one of the different rendered 3D object or at least one remaining rendered 3D object can include a rendered indication of a selected real-world object. The rendered indication of the selected real-world object can be displayed as an overlay in the updated AR content.

In certain example embodiments, the method can include receiving an input in a first environment identifying an object from a set of objects rendered in the field of view of the user device; generating new content in the first environment including: an updated object from the set; and at least one remaining object from the set; transitioning to a second environment comprising the AR content; and performing the method. The first environment can be a two-dimensional UI displaying the set of objects.

In certain example embodiments, the input can include a swipe gesture that identifies the one of the objects.

In certain example embodiments, the input can include identifying the one of the objects based on a zoomed field of view in the AR content.

In certain example embodiments, the method can include using the input to determine a replacement object as the different rendered 3D object, for the new AR content. The input can be used to determine at least one characteristic found in the replacement object.

In certain example embodiments, the method can include repeating the method to identify a different one of the objects or identify an additional one of the objects; and further updating the AR content based on the repeating.

In certain example embodiments, the method can include receiving a further input confirming a desired set of objects in the updated AR content; and executing an action associated with the desired set of objects. The action can include a retail checkout mechanism.

Updating Electronic Content by Selectively Replacing Virtual 3D Objects

A system and process are disclosed herein that can be used to replace or otherwise change a collection of objects in the scene in a stepwise or selective manner by locking in desired objects when appropriate, while permitting convenient changes to objects in the collection that are not locked. The disclosed system can apply changes or replacements to multiple virtual 3D objects at the same time, in response to a single input such as a gesture, tap/selection, field of view capture, or other input capable of identifying a specific object from within a collection of objects in the scene. The scope of the change or replacement can thus be limited to the objects that are not currently locked.

Other inputs can be applied to identify objects to be locked in the scene. For example, the locking mechanism can utilize a field of view, zoom level, or focus to either include or exclude objects. That is, the locking mechanism can be applied by locking the objects currently in the field of view or anything outside of the field of view. By identifying which object(s) is/are to be locked, a further discrete input such as a swipe gesture can be used to discard, shuffle, rotate or otherwise change the remaining objects in the collection to conveniently make changes to a curation or other arrangement in an intuitive and efficient manner. Gestures applied to multiple objects that are desired to be locked or changed can also be performed, e.g., a swipe across the desired objects to be locked or to be replaced/changed. Any other suitable input can be used, for example, eye tracking (e.g., with dwell), voice commands, long press, different types of gestures (swipe versus "thumbs up"/"thumbs down"), etc.

An example of an interactive UI workflow is as follows. In the following example, the operations are implemented using an app on a portable electronic device having a camera that can generate an AR environment. The app determines the virtual model(s) in the camera's field of view. The field of view can include the entire environment or scene, or a portion thereof. The app receives an input to "lock" specific virtual models. For example, the UI presented by the app may provide the user with an option to "Lock/Unlock All in Current View". The user can frame specific virtual models in the view by walking closer to them, angling the camera away from other virtual models etc. The app then receives an input such as a swipe gesture on the screen. The app determines, for the swipe gesture, the virtual models intersected by the path of the swipe gesture on the screen or identifies all virtual models that have not been locked or unlocked. The app replaces only the virtual models overlapped by the swipe gesture or otherwise not locked, with replacement virtual models. For example, for a swipe gesture over the following objects, couch A, coffee table B, wall clock C, the system can replace the virtual models with the following: couch B, coffee table C, wall clock D. When replacing the virtual models, the system can respect the position and type of object. For example, the system would replace couch A with couch B in the same position as couch A.

The app may further prompt the user to confirm that they wish to replace the objects that have not been locked, e.g., by prompting "Replace all in path?" in the above example. The app may present in a UI, the objects selected under the swiping gesture. The user may deselect items they wish to keep/lock to allow the user to correct errors or change their mind as they go.

The above workflow can be modified to adapt to the different inputs or types of changes being permitted. For example, tap or selection inputs can be used to identify and confirm objects to be locked in a first step, followed by a single gesture (further tap, swipe, voice command, etc.) that applies the change to the other objects. The change can be determined based on the tool or application currently implementing the system. For example, the app may provide different options for shuffling versus replacement.

The systems and processes described herein can be integrated into various types of computer-related environments, including environments having relatively high context or high bandwidth, such as AR or VR, in which a wider scene or richer environment surrounds the virtual 3D objects; as well as environments having relatively less context or lower bandwidth, such as a 2D UI with a collection of 2D images of 3D objects (or a collection of 3D objects) that can enable some objects in a collection to be locked and others replaced or changed using a set of stages inputs as described herein. The system can also implement multiple ones of these types of environments in stages. For example, the low-context 2D collection can be used to quickly mix and match objects after which the user can opt to place the current ensemble in a curation or other arrangement in an AR or VR environment.

In an AR environment, the collection of objects that can be locked, replaced or changed in some other way can include all virtual objects or a mixture of real-world and virtual objects. These objects can also be placed in real-world or virtual scenes or rooms. For example, a curation in the environment can begin with a current real-world wall clock in the user's room and while cycling through options for the couch, coffee table and rug, the user can opt to unlock a real-world item and thereafter overlay (or fade out and replace) with a suggested replacement using a virtual model of a new clock. The replacement can, as noted above, respect the placement of the wall clock or the system can, as part of the suggested changes, suggest a new orientation or position, e.g., based on size, style, etc. As such, the AR environment may be more appropriate in some scenarios over VR environments on the one hand (to incorporate real-world details), while VR environments with every object and the scene itself being virtual, may have other unique advantages that can be leveraged in different applications or scenarios (designing from scratch or envisioning anew). Accordingly, the app and backend system serving the app can provide multiple options to a user to switch between the different types of computer-related environments to adapt to different projects by the user.

The backend system serving the app can be configured to generate initial sets of objects or default curations as well as to intelligently determine the next item or next change to objects that are not locked. At the outset, the app can allow the user to provide their own starting point, input a generic style, or select from a list of images or questions to begin. The system can then render the initial set, which may include both virtual objects and real-world objects depending on the environment. The system described herein can also be used in a preliminary phase in a 2D mode akin to a set of reels that allow users to scroll through replacements independently or in tandem, while locking items that are desirable until an initial collection is determined. The initial collection can then be transported or transferred into a richer environment such as by importing the virtual objects into an AR environment such as the user's own room where they wish to preview the objects. The user may then choose to lock certain objects and apply an input to have the remaining objects replaced or otherwise changed.

For this example, one can assume the change includes a replacement of each unlocked object, but the principles could apply to rotations, movements, or shuffling of the positions of the objects in other applications. As the user selectively locks and replaces objects, the replaced objects can be more intelligently selected using input signals provided by what has been locked and/or discarded (e.g., what I like, what I don't like, etc.). For example, as one object is selected to be locked, the system can determine that the order or "track" of suggested replacements should change from a current track to a new track. That is, the inputs to the system can be leveraged to successively narrow in on a style or arrangement that suits what appears to be preferred by that user at that time for that collection.

As selections are made, other changes can be suggested. For example, if the user locks in on a larger couch, the system can automatically suggest (or simply just apply) a new orientation to the room. This can include suggesting the removal of objects that would no longer fit or suggest new objects that are resized. For example, a larger couch or sectional could trigger removal of a loveseat or a smaller or larger coffee table or rug to be selected. The recommended replacements can therefore be further filtered based on size factors once locked-in virtual objects are selected. The locking/unlocking and change/replacement/suggestion cycle can be repeated until the user accepts the curation. The acceptance can lead to any suitable further step such as a retail checkout mechanism in a retail environment, a proposed design layout in a design environment, a list of materials, etc.

Selecting the replacements can include determining visual/stylistic parameters. For example, the system may select the couch that is most similar in color/pattern/texture/theme to the first couch. Additionally, the system may use object detection, image processing and/or machine learning (ML) models to determine characteristics of the object(s) to then determine the best candidate for replacement based on existing objects in the room. Similarly, the system may select the couch that is most similar to the first couch in length and width. Product categories can also be considered. For example, for a buyer advancing through options for couch cushions the system can first prioritize all cushions in their curated list before moving to the throw blankets in the buyer's list. The virtual collection may be selected from a catalog or positioned in the field of view based on real objects detected in the field of view (e.g., in augmented reality applications).

The system described herein can also be used, and the described processes applied, in multiple stages. For example, a locking/replacement stage can be applied to determine the desired set of items in the environment, then a locking/shuffling stage applied to allow other changes to be previewed such as arrangements of the furniture in the room with the locking input allowing the user to fix certain orientations within the environment while others can be moved around.

The principles discussed herein can be implemented in any computer-related environment (including 2D, AR, VR, etc.) where multiple objects are to be viewed together in a collection and changes to the collection are possible and desired. This can include integrating a feature into an e-commerce website that launches a curation or room view feature prior to purchasing a set of items, a design studio for interior design or engineering/architecture modeling, gaming applications in which objects are selected for a VR or AR environment, etc.

Turning now to the figures, FIG. 1 illustrates an example of a computing environment 10 in which virtual 3D objects (hereinafter referred to as 3D objects interchangeably) can be viewed and electronic content updated by selectively replacing 3D objects being displayed in an electronic environment. The computing environment 10 shown in FIG. 1 can represent a single device such as a portable electronic device or the integration/cooperation of multiple electronic devices such as a client device and server device or a client device and a remote or offsite storage or processing entity or service. That is, the computing environment 10 can be implemented using any one or more electronic devices including standalone devices and those connected to offsite storage and processing (e.g., via cloud-based computing storage and processing facilities). For example, a UI may be provided by an electronic device while data used to load, view, and manipulate the 3D objects as described herein can, at least in part, be stored and accessed from an external memory or application, including a cloud-based service or application.

Such electronic devices can include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a VR device, an AR device, etc.

The computing environment 10 includes an object viewer tool 12 that is coupled to a display 14 to render and present/display UI elements utilized in an application corresponding to or including the tool 12, on the display 14. While examples referred to herein may refer to a single display 14 for ease of illustration, the principles discussed herein can also be applied to multiple displays 14, e.g., to compare multiple objects or view multiple UIs at the same time on side-by-side screens. That is, any reference to a display 14 can include any one or more displays 14 or screens providing similar visual functions. The object viewer tool 12 receives one or more inputs from one or more input devices 16, which can include or incorporate inputs made via the display 14 as illustrated in FIG. 1 as well as any other available input to the computing environment 10, such as haptic or touch gestures, voice commands, eye tracking, biometrics, keyboard or button presses, etc. Such inputs may be applied by a user interacting with the computing environment 10, e.g., by operating an electronic device having the display 14 and at least an interface to one or more input devices 16.

The object viewer tool 12 also includes an AR module 18 for generating, displaying, and manipulating virtual 3D objects in an AR environment; and a VR module 20 for generating, displaying, and manipulating virtual 3D objects in a VR environment; further details of which are provided below. The AR module 18 and VR module 20 can be implemented as separate components coupled to the object viewer tool 12 or can be integrated/embedded in the object viewer tool 12 as shown in FIG. 1. As such, the configuration shown in FIG. 1 is for illustrative purposes and can be reconfigured to suit different computing environments 10. For example, the AR module 18 and/or VR module 20 could be provided by a separate entity such as a server application or other client application connected to the object viewer tool 12 over a communication network (not shown). Such communication network(s) may include a telephone network, cellular, and/or data communication network to connect different types of client- and/or server-type devices. For example, the communication network may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

The computing environment 10 also includes camera 22, which can correspond to a component or device integrated into an electronic device or a separate camera feed from a different and/or standalone camera device in other computing environments 10. The camera 22 is positioned to capture a scene within the field of view 32 of a camera lens (not shown) by being manually directed at the desired scene or automatically directed at same. The content captured by the camera 22 is fed to the object viewer tool 12 to be used with the AR module 18 to combine virtual and real-world content in an AR environment. The camera 22 may also be used with the VR module 20, e.g., to select and render 3D objects in the VR environment based on objects detected from images and/or video content captured by the camera 22. The camera 22 can be configured to capture still images, video, or more typically both still images and video content.

The object viewer tool 12 can include or have access to a database, repository or other storage element or service having one or more virtual 3D objects 24 that the object viewer tool 12 can display for the user by obtaining and providing such 3D objects 24 to the AR module 18, VR module 20, or another electronic UI such as a 2D application or webpage tab/window. The 3D objects 24 can include individual objects sourced from proprietary sources as well as various available 3$^{rd}$ party object sources 30, which can include catalogues, inventories, or other sources that can be open/free sources, subscription-based or otherwise. The database of 3D objects 24 (3D objects 24 more generally) can therefore represent any storage or memory element, databank, service or source that can be used by the object viewer tool 12 in rendering content on the display 14 for viewing, manipulating, replacing, selecting, changing, shuffling, moving or otherwise interacting with the 3D objects 24. The 3D objects 24 can include virtual 3D models, real-world 3D renderings, or 2D data that when rendered on the display 14 appears in 3D. As such, the term 3D objects 24 (or objects more generally) may be used herein to refer to any data that, when obtained and rendered, enables the object viewer tool 12 to render objects on the display 14 in a UI such as in AR or VR environments as well as within 2D UIs such as apps and browser windows/tabs. Moreover, while the examples described and shown herein may refer to the objects as being 3D objects, such objects can also be displayed, in at least some environments, in a 2D form or otherwise have 2D data that can be representative of a corresponding 3D object whether in the virtual world or real-world.

The database or repository of 3D objects 24 can include, among other things, collections 26 of 3D objects 24 that can be used to display certain objects together, for example, to provide the user with options/recommendations for objects 24 that may look aesthetically pleasing next to one another in a room or would otherwise be part of a set or be complementary and thus could be suggested to the user when viewing 3D objects 24 in AR, VR or 2D environments. For example, a 3D object 24 initially loaded and displayed in a room viewer application may be tagged with one or more collections 26 with which it has been associated, thus providing the object viewer tool 12 with suggested complementary objects that can be rendered in the currently viewed electronic environment. By tagging certain 3D objects 24 in multiple collections 26, the object viewer tool 12 can determine multiple different tracks or themes/styles along which the user can be guided while reviewing locking/unlocking, replacing, or changing 3D objects 24 being displayed for them. For example, an initial 3D object 24 can be determine using any heuristic or may be supplied manually or proactively by the user, after which, the 3D object 24, if tagged, can be used to determine a collection 26 for other 3D objects 24 of the same style or different styles if the user has chosen to replace that object 24. The initial 3D object 24 can also be analyzed using an image processing technique to determine a characteristic, feature, marker, or other detectable element in order to associate that 3D object 24 with similar or dissimilar 3D objects 24, including collections that contain such similar or dissimilar 3D objects 24 for use in updating content in an electronic environment such as an AR or VR environment or a 2D UI as described above.

The 3D objects 24 can also be included with or provided by a separate content provider application (not shown), which can be a standalone application or feature embedded in or accessed by another application or service. Such a content provider application can include an application that has been programmed, configured, and can be instructed or requested to provide content to the object viewer tool 12, in order to display such content on the display 14 and to interact with same, e.g., via the input device(s) 16. The content provider application can be a module or feature embedded in or accessible to any application that provides 2D and/or 3D content as an output, in response to a request, query, trigger, threshold or other input. For example, the content provider application can facilitate creating product pages and generating content for products to be displayed on those pages, as well as responding to search queries or detecting navigation into a catalogue or other list of objects to be displayed to a user within the computing environment 10. As noted above, the computing environment 10 can represent a single electronic device or multiple electronic devices in a client-server relationship such that the content provider application can be either an application running on the same electronic device as the display 14, input device(s) 16 and object viewer tool 12, or be a remote service that receives and responds to data retrieval calls from the object viewer tool 12, e.g., in providing a room viewer or curation option in a UI being displayed on the display 14.

In the example configuration shown in FIG. 1, the computing environment also includes a machine learning tool 28. The machine learning tool 28 can be used to train machine learning models associated with products or product types to allow users to determine characteristics of a 3D object 24 selected for replacement or to remain in a curation, e.g., to associate that 3D object 24 with a collection 26. The machine learning tool 28 can create or train existing models or new models based on usage of the object viewer tool 12. For example, collections of 3D objects 24 selected by users or identified automatically by the object viewer tool 12 can be fed to the machine learning tool 28 to train one or more machine learning models that permit the object viewer tool 12 to determine characteristics that can be tagged in the 3D models 24 and/or collections 26. The characteristics modeled and tagged in this way can be based on product type or other characteristics such as gender, style, category, theme, etc. The machine learning tool 28 can therefore be leveraged by the object viewer tool 12 to determine suitable replacement objects 24 to suggest to a user based on an input requesting replacement of the objects 24 as discussed further below.

The machine learning tool 28 can be used to train machine learning models by generating classifiers that can be used to predict an appropriate replacement object 24 or suitable collection 26 (suggesting same) given an input related to the selected 3D object 24. For example, a trained model associated with the 3D object 24, or other data such as product type or category, can be input to the machine learning tool 28 to run that data against a set of classifiers that have been generated and can be used to understand how the input variables relate to the associated classes. The classifiers can be trained using the machine learning tool 28 (or another machine learning system) by labeling a dataset of 3D objects 24 to enable the input data to be used to find the most appropriate 3D object 24 or a collection 26 that suggests a suitable replacement or complementary object 24. The model can be built and trained in this way and used to identify characteristics associated with the object (either in its virtual or a real-world form), that are based on the input data used to train the dataset. That is, specific datasets can be used to train models that identify desirable characteristics based on a class, the class being associated with a product, product type, or other characteristic used to classify an input to the machine learning model 28 to in turn identify the appropriate replacement 3D object 24 or new collection 26 that can complement a desired and selected 3D object 24.

Figure 2A:
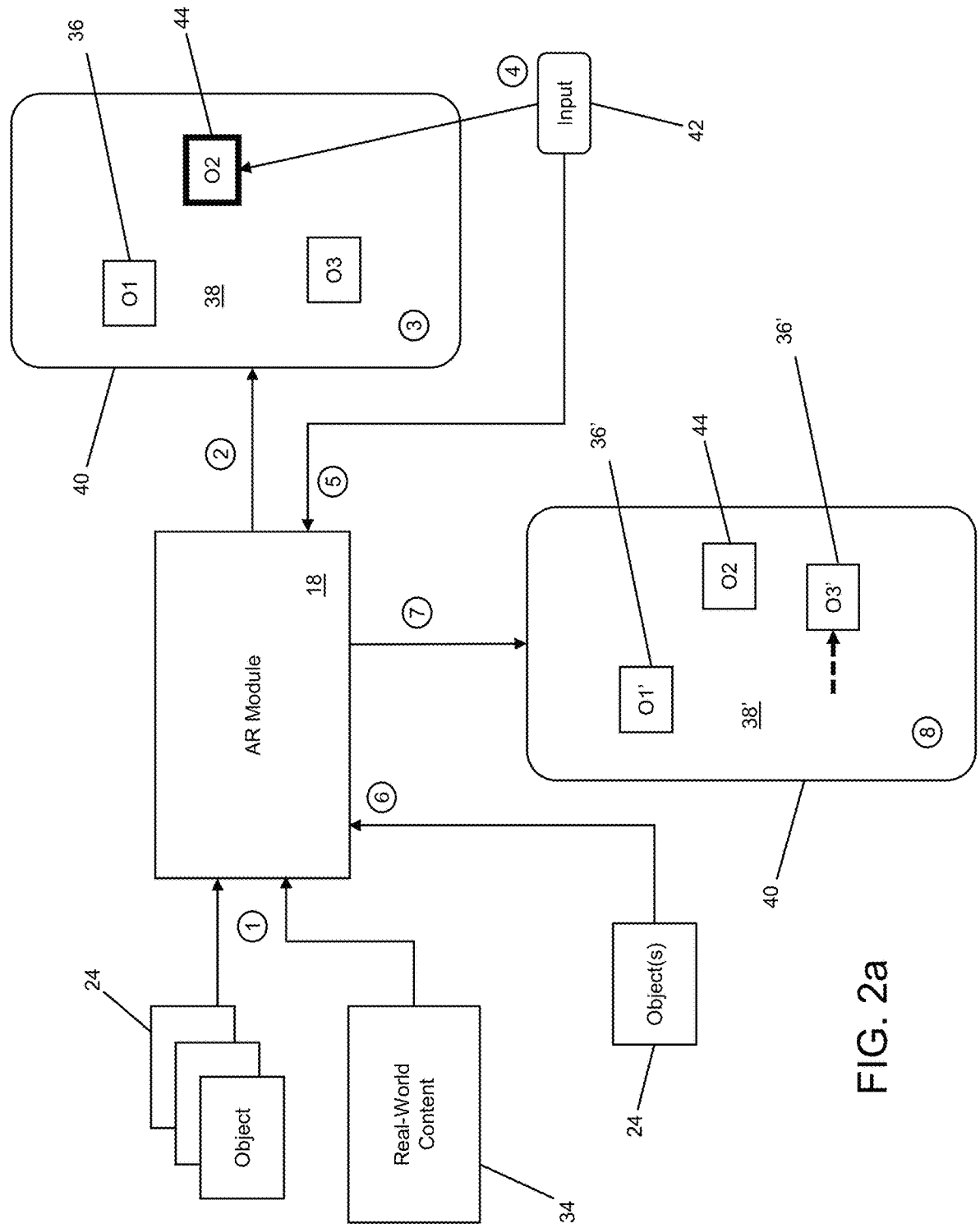
FIG. 2a shows a workflow for updating electronic content in an AR environment.

FIG. 2a illustrates a workflow that can be implemented in using the AR module 18 by the object viewer tool 12 to update electronic content by selectively replacing 3D objects 24 being displayed in an AR environment. In this example, the AR module 18 receives at step 1 one or more 3D objects 24 that are to be displayed on or with real-world content 34, such a current view captured by the camera 32. The AR module 18 combines the 3D objects 24 and the real-world content 34 in a predetermined manner at step 2, such as to present the 3D objects 24 in a real-world room for an application that utilizes the object viewer tool 12 or for the object viewer 12 itself. The real-world content 34 can include other objects, which may also be considered 3D objects 24 but originate from the real-world content 34. As such, in the present disclosure, the content displayed by the object viewing tool 12 (e.g., using the AR module 18 and/or VR module 20) can include a set of objects, which may include objects that are part of the environment as well as at least some objects that are rendered 3D objects 24. Such rendered 3D objects 24 can be inserted into an existing environment such as with the real-world content 34 or can overlay existing objects in that environment.

At step 3, the combined AR content is rendered in an AR environment 38 on an electronic display 40. For the purpose of this example, the AR environment 38 includes three objects, namely O1, O2, and O3 that are placed in the AR environment 38 in a particular manner, e.g., to show a collection 26 of objects 24 in a real-world room. An input 42 is applied at step 4 to identify a selected object 44 and one or more other objects 36, also referred to herein as the non-selected objects 36. It can be appreciated that the objects 36, 44 may also be referred to herein as locked and unlocked objects and the input 42 in step 4 can be used to either identify an object or objects to be locked or an object or objects to be unlocked as illustrated in examples below.

The AR module 18 receives data associated with the input 42 at step 5, for example, an identification of which 3D objects 24 have been selected and for what purpose. In this example, the selected object 44, namely O2, has been locked thus indicating that the user wishes to keep this object in the AR environment 38 and replace the unlocked objects or unselected objects 36, namely O1 and O3. At step 6, the AR module 18 receives, retrieves or otherwise obtains any one or more objects 24 that are to be replaced in the AR environment 38, in this example, new objects 24 for O1 and O3. At step 7, the AR module 18 then updates the content in the AR environment 38 to replace O1 with O1' and to replace O3 with O3', denoted by numeral 36' in FIG. 2a. The updated AR environment 38' is then rendered on the electronic display 40 at step 8. As indicated by the dashed line in FIG. 2a, in this example, O3' also includes a change of position in the updated AR environment 38'. The changes or updates to the AR environment 38 in rendering the updated AR environment 38' can therefore include other changes or updates in addition to locking and replacing 3D objects 24. For example, in addition to a position change or translation as shown in FIG. 2a, a shuffling or resizing of the 3D objects 24 could also be performed, as well as a rotation or other change in orientation. In the case of the positional change shown in FIG. 2a, O3' may be of a larger size and require a new placement in the AR environment 38. That change and other changes can also be made for stylistic or aesthetic purposes, for example, if the new objects O1' and O3' are part of a collection 26 that also includes O2 that was originally rendered in the AR environment 12.

Figure 2B:
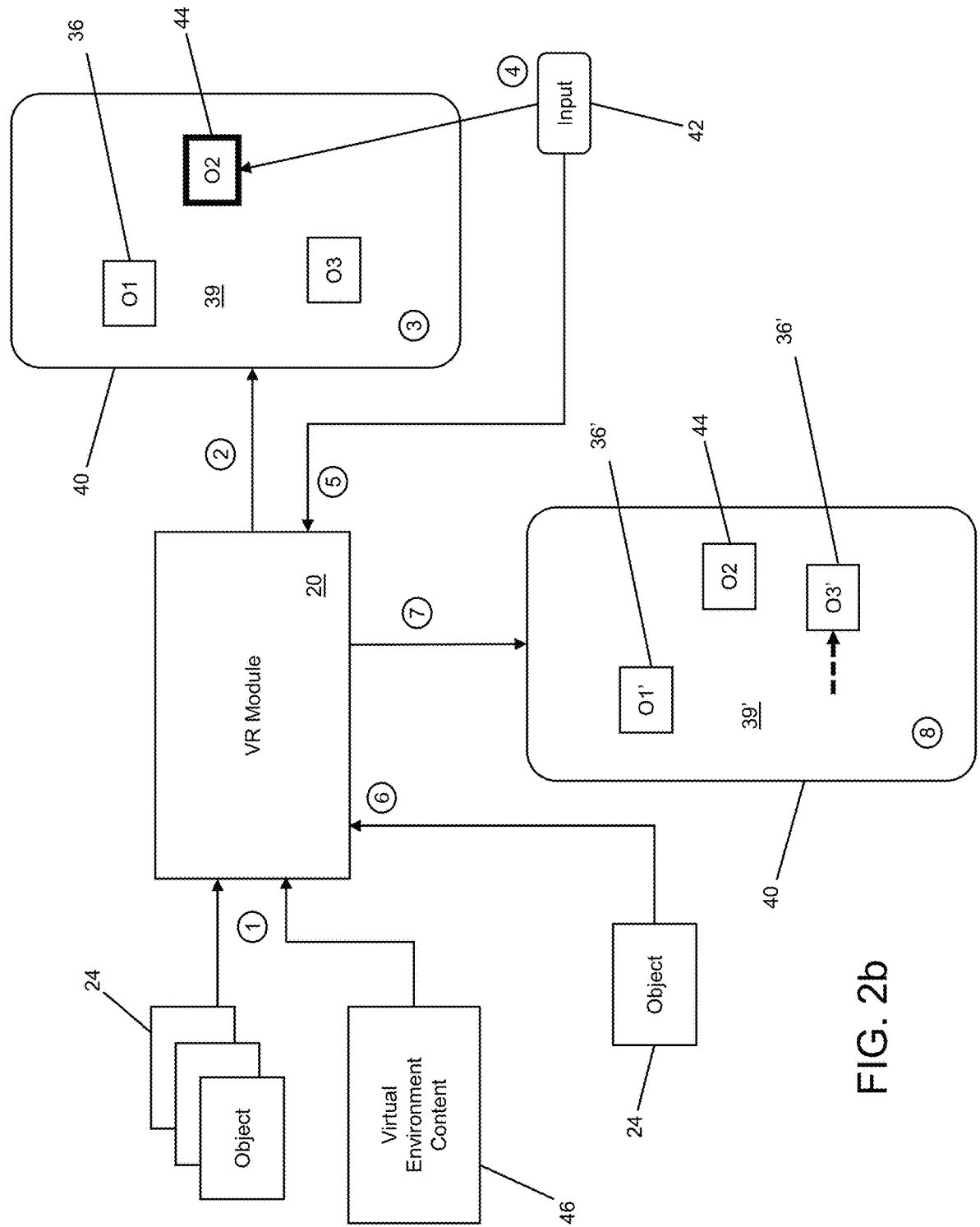
FIG. 2b shows a workflow for updating electronic content in a VR environment.

FIG. 2b illustrates a workflow that can be implemented in using the VR module 20 by the object viewer tool 12 to update electronic content by selectively replacing 3D objects 24 being displayed in a VR environment. In this example, the VR module 20 receives at step 1 one or more 3D objects 24 that are to be displayed on or otherwise with virtual environment content 46, such a virtual room or other virtual environment in which the 3D objects 24 can be placed and viewed. The VR module 20 incorporates the 3D objects 24 into the virtual environment content 46 in a predetermined manner at step 2, such as to present the 3D objects 24 in a virtual room for an application that utilizes the object viewer tool 12 or for the object viewer 12 itself. At step 3, the VR content is rendered in a VR environment 39 on an electronic display 40. For the purpose of this example, the VR environment 39 includes three objects, namely O1, O2, and O3 that are placed in the VR environment 39 in a particular manner, e.g., to show a collection 26 of objects 24 in a virtual room. An input 42 is applied at step 4 to identify a selected object 44 and one or more other objects 36, also referred to herein as the non-selected objects 36. It can be appreciated that the objects 36, 44 may also be referred to herein as locked and unlocked objects and the input 42 in step 4 can be used to either identify an object or objects to be locked or an object or objects to be unlocked as illustrated in examples below.

The VR module 20 receives data associated with the input 42 at step 5, for example, an identification of which 3D objects 24 have been selected and for what purpose. As with the AR example, in this VR example, the selected object 44, namely O2 has been locked thus indicating that the user wishes to keep this object in the VR environment 39 and replace the unlocked objects or unselected objects 36, namely O1 and O3. At step 6, the VR module 20 receives, retrieves or otherwise obtains any one or more objects 24 that are to be replaced in the VR environment 39, in this example, new objects 24 for O1 and O3. At step 7, the VR module 18 then updates the content in the VR environment 39 to replace O1 with O1' and to replace O3 with O3', denoted by numeral 36' in FIG. 2b. The updated VR environment 39' is then rendered on the electronic display 40 at step 8. As indicated by the dashed line in FIG. 2b, in this example, O3' also includes a change of position in the updated VR environment 39', similar to the AR example.

Figure 2C:
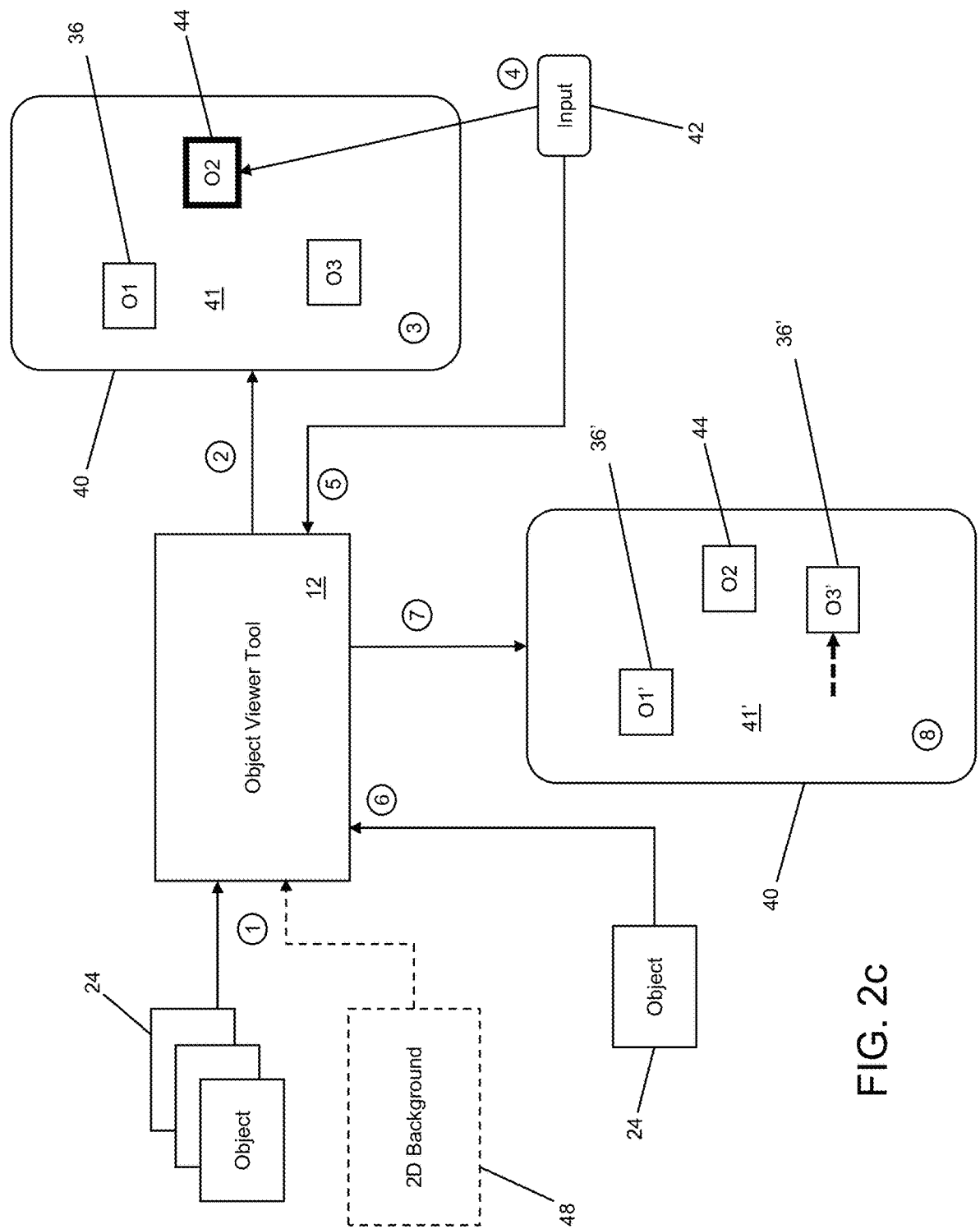
FIG. 2c shows a workflow for updating electronic content in a 2D user interface environment.

FIG. 2c illustrates a workflow that can be implemented in using the object viewer tool 12 to update electronic content by selectively replacing 3D objects 24 being displayed in a 2D environment, including 2D UIs such as apps, browser windows/tabs, etc. In this example, the object viewer tool 12 receives at step 1 one or more 3D objects 24 that are to be displayed in a 2D environment. Optionally, as shown in dashed lines in FIG. 2c, the 3D objects 24 can be displayed on or otherwise with a 2D background 48 or other content. For example, the 3D objects 24 can be displayed together in a tab associated with an e-commerce page such as a product or room viewer. The object viewer tool 12 incorporates the 3D objects 24 into the 2D environment (e.g., with the 2D background 48 or other content) in a predetermined manner at step 2, so as to present the 3D objects 24 in a virtual room for an application that utilizes the object viewer tool 12 or for the object viewer 12 itself. At step 3, the 2D content with the 3D objects 24 is rendered in a 2D environment 41 on an electronic display 40. For the purposes of this example, the 2D environment 41 includes three objects, namely O1, O2, and O3 that are placed in the 2D environment 41 in a particular manner, e.g., to show a collection 26 of objects 24 in an app or webpage arranged next to each other and with or without a background 48. An input 42 is applied at step 4 to identify a selected object 44 and one or more other objects 36, also referred to herein as the non-selected objects 36. It can be appreciated that the objects 36, 44 may also be referred to herein as locked and unlocked objects and the input 42 in step 4 can be used to either identify an object or objects to be locked or an object or objects to be unlocked as illustrated in examples below.

The object viewer tool 12 receives data associated with the input 42 at step 5, for example, an identification of which 3D objects 24 have been selected and for what purpose. As with the AR and VR examples, in this 2D example, the selected object 44, namely O2 has been locked thus indicating that the user wishes to keep this object in the 2D environment 41 and replace the unlocked objects or unselected objects 36, namely O1 and O3. At step 6, the object viewer tool 12 receives, retrieves or otherwise obtains any one or more objects 24 that are to be replaced in the 2D environment 41, in this example, new objects 24 for O1 and O3. At step 7, the object viewer tool 12 then updates the content in the 2D environment 41 to replace O1 with O1' and to replace O3 with O3', denoted by numeral 36' in FIG. 2c. The updated 2D environment 41' is then rendered on the electronic display 40 at step 8. As indicated by the dashed line in FIG. 2c, in this example, O3' also includes a change of position in the updated 2D environment 41', similar to the AR and VR examples.

Figure 3:
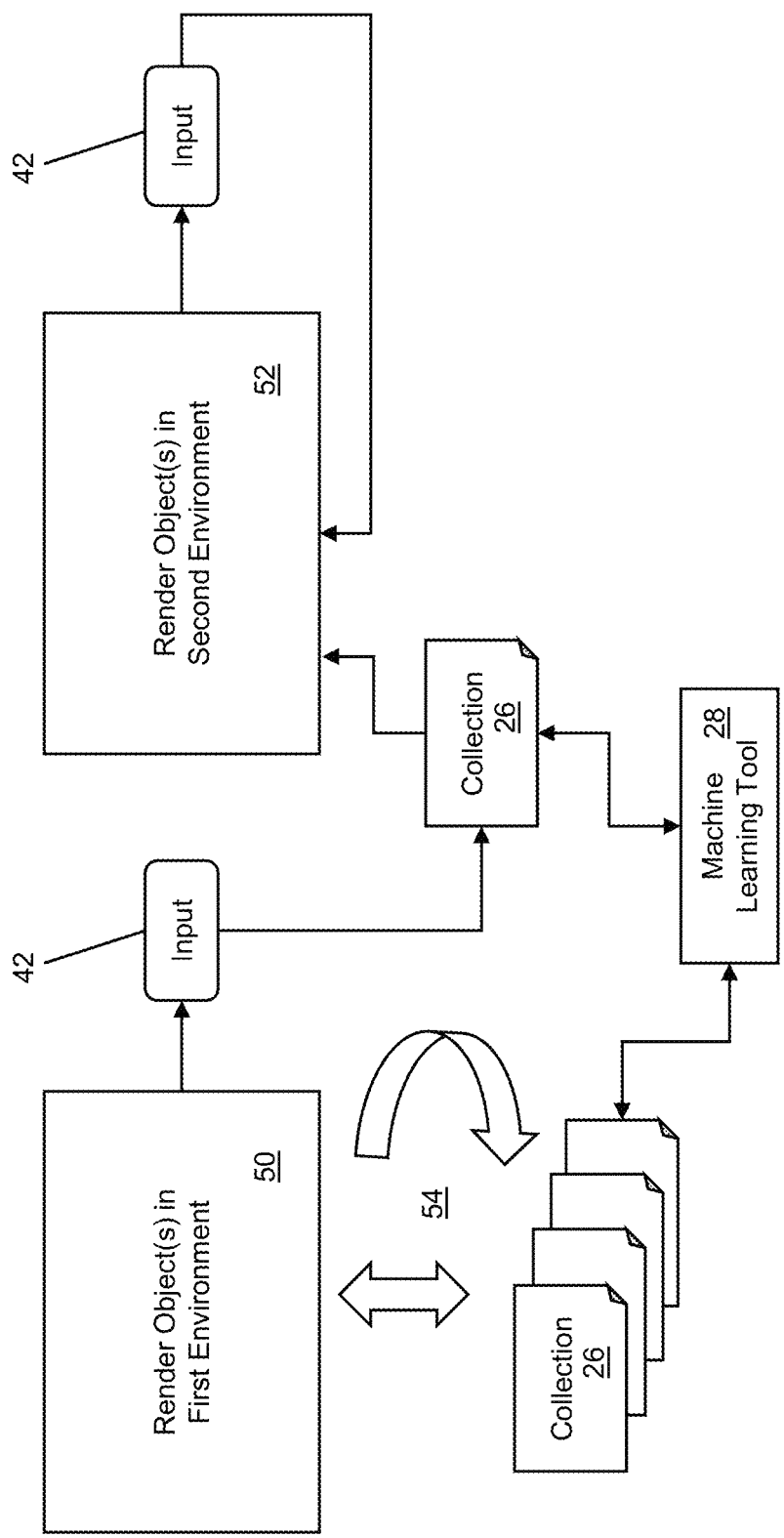
FIG. 3 shows a workflow for updating electronic content in a first environment and transitioning to a second environment to further update the electronic content.

As illustrated by the examples in FIGS. 2a-2c, the object viewer tool 12 can be used in and with different types of environments, including AR, VR and traditional 2D electronic UIs such as apps and webpages or tabs. The object viewer tool 12 can also be used to navigate between such environments as illustrated in FIG. 3. As shown in FIG. 3, the object viewer tool 12 can be used to render objects in a first environment at block 50. The user can interact with this first environment rendered in block 50 by making selections and rendering updated content at 54 as discussed herein. This can include accessing and/or referring to collections 26 and utilizing the machine learning tool 28 to identify or generate tags that can be used in making associations between displayed 3D objects 24 and suitable collections 26 that are similar or dissimilar, depending on the nature of the input (i.e., replacement or locking/keeping). In this example, an input 42 to or from the first environment at block 50 can cause the object viewer tool 12 to transition to, and render objects in, a second environment at block 52. For example, after navigating through various collections in the first environment at block 50, the user may wish to then begin a more detailed review within a richer environment such as an AR or VR environment rendered at block 52. In this way, processing and storage requirements associated with such a richer and data intensive rendering in AR or VR can be deferred until a first pass of objects 24 is performed in a 2D environment. In this example, a suitable collection 26 is selected to render in or with the second environment at block 52 and further inputs 42 may be detected to cycle through different changes to the second environment and its content, as described herein.

Figure 4:
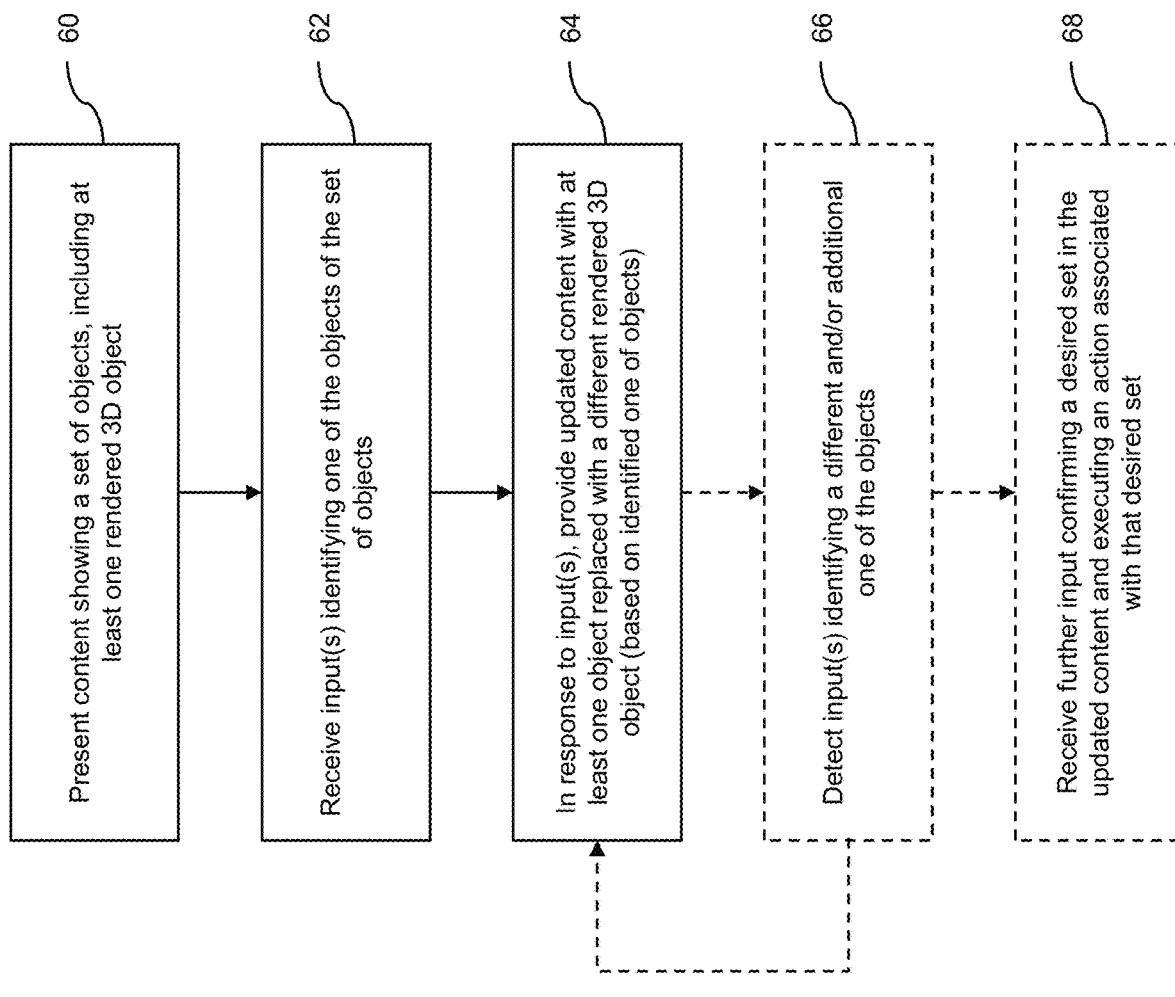
FIG. 4 is a flow chart illustrating an example set of computer executable instructions that can be executed for updating electronic content by selectively replacing virtual 3D objects being displayed in an electronic environment.

Referring now to FIG. 4, a flow chart is provided illustrating example computer executable instructions that can be implemented in updating electronic content by selectively replacing 3D objects 24 being displayed in an electronic environment 38, 39, 41. The operations shown in FIG. 4 may be implemented by an electronic device in the computing environment 10 by utilizing the object viewer tool 12 and the AR module 18 and/or VR module 20. At block 60, the object viewer tool 12 (or an application utilizing the object viewer tool 12 or using the AR module 18 and/or VR module 20) presents content showing a set of objects. The set of objects can include, as exemplified above, part of the real-world content 34, items or objects in the virtual environment content 46, as well as at least some 3D objects 24 that are rendered and displayed in the environment 38, 39, 41 as herein described. At block 62, the object viewer tool 12 receives or otherwise detects or is informed of the receipt of an input 42 identifying one of the objects in the set of objects presented in the environment. It can be appreciated that the input 42 can identify one of the rendered 3D objects 24 or an object that is part of the content displayed in the environment 38, 39, 41, e.g., a background object (virtual or real), or other real-world object that can be selected and a new 3D object 24 overlaid thereupon.

At block 64, in response to the input 42, the object viewer tool 12 provides updated content. The updated content replaces at least one of the objects presented in block 60 with a different rendered 3D object 24. The replaced at least one of the objects is determined based on the identified object from block 62. For example, the object identified in block 62 could be a 3D object 24 to be replaced or another object in the environment that is to be overlaid with a 3D object 24. Optionally, as illustrated in dashed lines, at block 66, one or more additional inputs may be detected that identify different and/or additional ones of the objects currently being presented in the environment and repeating block 64 to further update the content. Additionally, at block 68, the object viewer tool 12 (or an application utilizing the object viewer tool 12 or using the AR module 18 and/or VR module 20) can receive a further input confirming a desired set of objects in the updated content and execute an action associated with that desired set. For example, when viewing different collections 26 or curations in a room viewer application, the user may be satisfied with a curation and decide to confirm that set and output a room design, a set of objects to purchase, etc.

Referring now to FIG. 5, a flow chart is provided illustrating example computer executable instructions that can be implemented in presenting an updating content as shown in FIG. 4 in multiple different electronic environments, the workflow for which is illustrated in FIG. 3, discussed above. At block 70, the object viewer tool 12 (or an application utilizing the object viewer tool 12 or using the AR module 18 and/or VR module 20) receives an input in the first environment being rendered 50, which identifies an object from a set of objects rendered on the electronic user device. The object viewer tool 12 generates new content in the first environment, including an updated object from the set and at least one remaining object. For example, the first environment rendered at block 50 in FIG. 3 can be used to cycle through objects by locking and replacing the locked or unlocked objects being presented such that at least one object is replaced while at least one other remains. At block 74, the object viewer tool 12 in this example transitions to a second environment and renders content as illustrated in FIG. 4, that is, by proceeding to operation 60. The other operations in FIG. 4 may then be executed at block 76. It can be appreciated that the operations shown in FIG. 5 assume a different workflow within the first environment as opposed to the second environment, e.g., when transitioning from a low bandwidth 2D environment 41 to an AR or VR environment 38, 39 after some preliminary filtering, or transitioning from an operating mode primarily for building a collection of objects to an operating mode primarily for viewing objects in a collection of objects. As such, the operations shown in FIG. 4 can also be repeated by having the action executed in block 68 correspond to a transition action to move to a different environment and then repeat the process at block 60.

Referring now to FIGS. 6a to 6f, an example of an AR room designer UI 200 and its operation are shown. In this example, the AR room designer UI 200 is presented on an electronic display 40, e.g., of a personal electronic device. The AR room designer UI 200 includes real-world content 201, in this example, the view of a living room, and a number of elements that are overlaid on this real-world content 201. For example, an AR Room Designer logo 202 can be placed over a corner of the real-world content 201 to indicate to the user that the AR module 18 is being used and that virtual elements are being displayed over what is viewed by the camera 22. It can be appreciated that the real-world content 201 can be a live, real-time capture of the field of view 32 of the camera 22 or can be a recording (image or video). That is, the AR room designer UI 200 can be used in both live and "on-demand" settings regardless of the temporality of the real-world content 201.

Figure 6A:
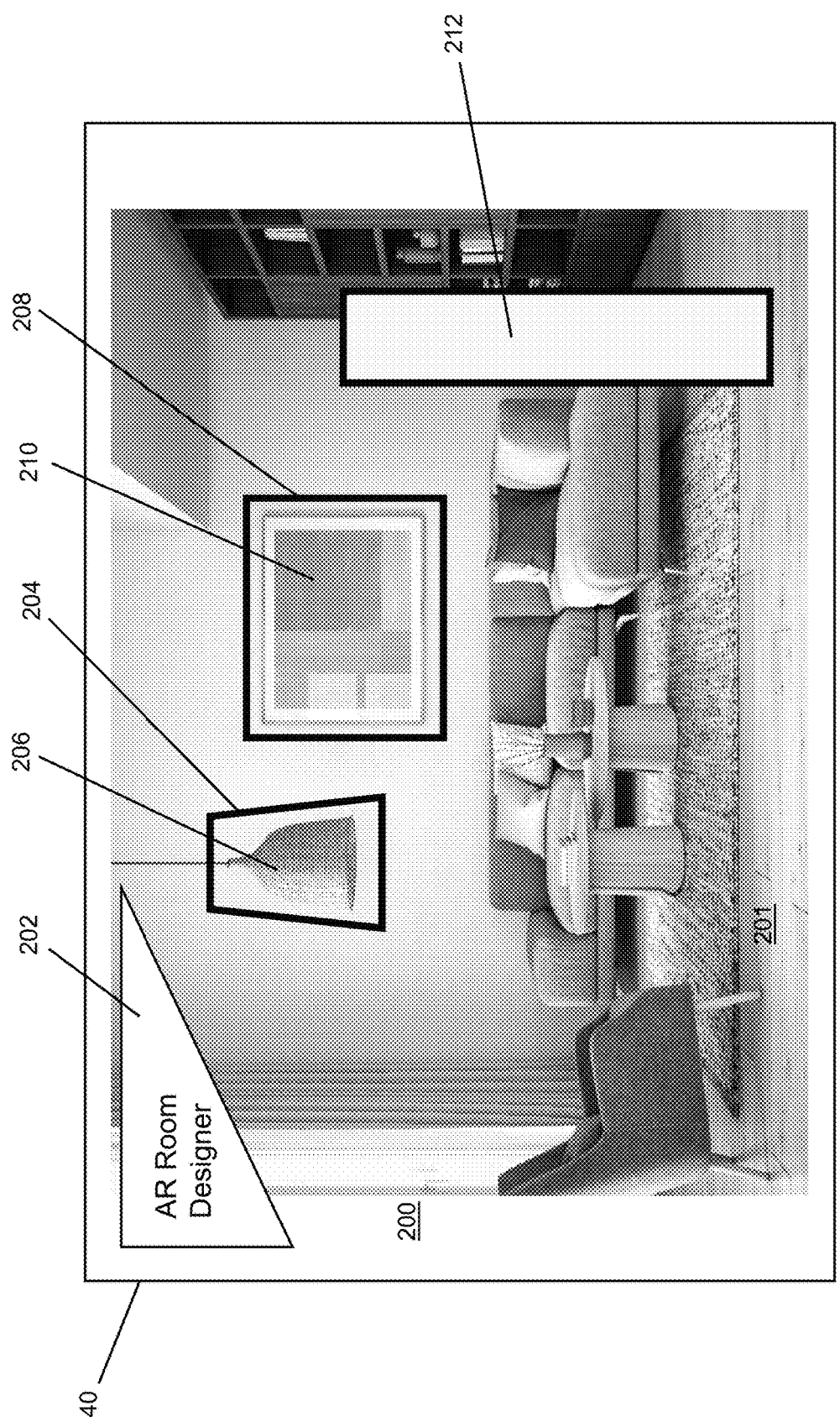
FIG. 6a shows an example of an AR room designer user interface (UI) in which objects are selected for replacement and an area is identified for inserting an object.

In the example shown in FIG. 6a, a first bounding box 204 is used to highlight or select a first object 206, in this example a lamp that is part of the real-world content 201. A second bounding box 208 is used to highlight or select a second object 210, in this example artwork that is hanging on a far wall in the real-world content 201. The bounding boxes 204, 208 can be user-selected or automatically applied by the object viewer tool 12. For example, the object viewer tool 12 may have received an input indicating that the user desires to curate their living room or has specific inputs to suggest that they are considering changing the lamp and artwork or want to keep such items and replace others. The object viewer tool 12 can also apply an image processing technique to automatically identify discrete items in the real-world content 201. Further data can also be used such as having access to a catalogue of available items that could be suggested or by referencing the collections 26 of 3D objects 24 available to the computing environment 10 in order to provide a preliminary suggestion or starting point.

In the example shown in FIG. 6a, an empty bounding box 212 is shown, which is one example of a mechanism that can be used to mark where to place a 3D object 24 that would be inserted in addition to what is shown in the real-world content 201 (and items suggested to replace such content 201). In the living room shown in FIG. 6a, the empty bounding box 212 is used to mark out a space or region in which to place a floor lamp.

Figure 6B:
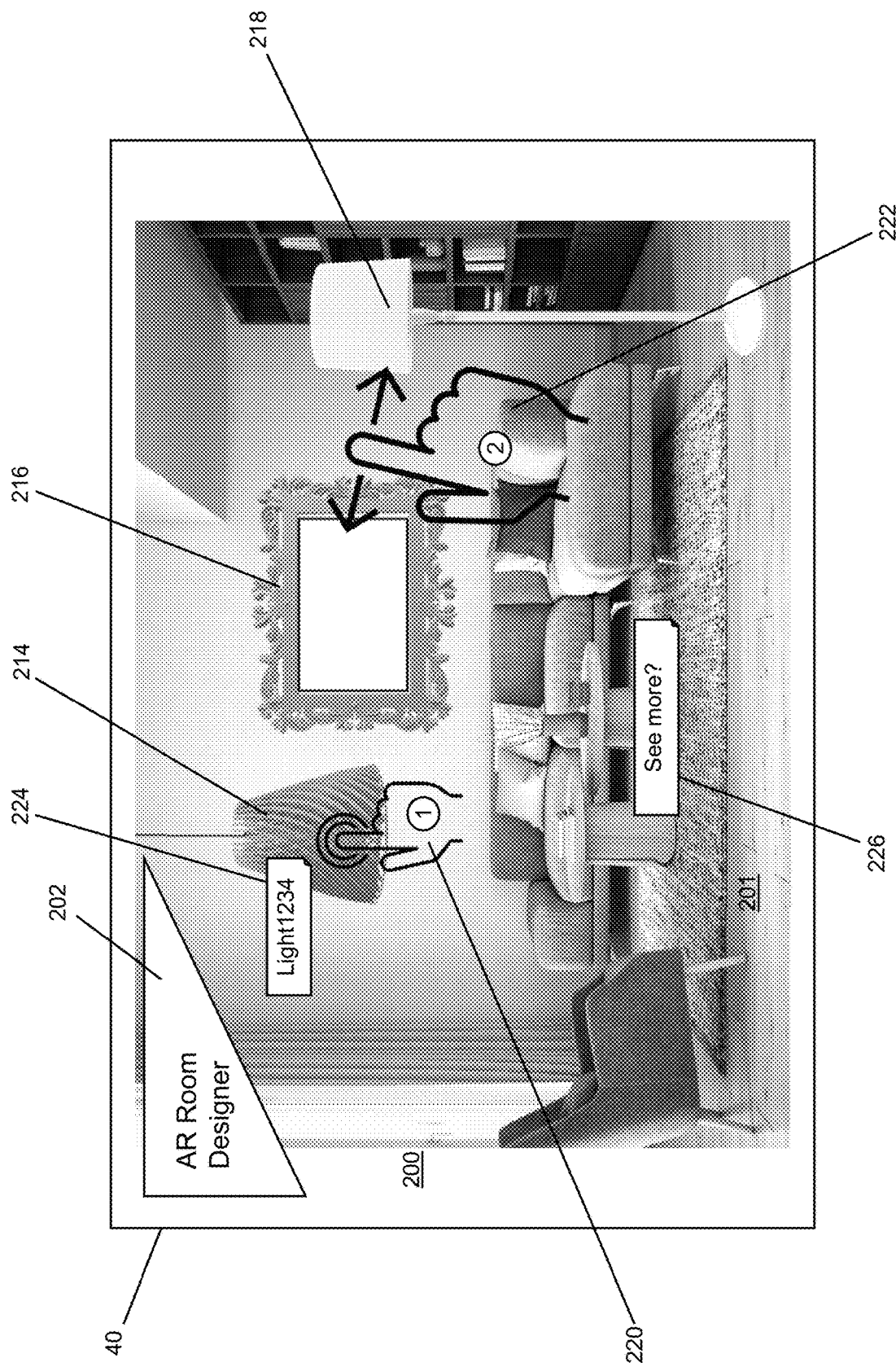
FIG. 6b shows the AR room designer UI with objects overlaying the objects selected for replacement and a new object inserted.

Referring now to FIG. 6b, the AR room designer UI 200 is shown with a first replacement 3D object 214 displayed in replacement of the first object 206 and a second replacement 3D object 216 displayed in replacement of the second object 210. The replacement objects 214, 216 in this example are 3D models of items placed in the environment defined by the real-world content 201, namely an overhead lamp (first replacement object 214) and a framed mirror (second replacement object 216). Also shown in FIG. 6b is a suggested new 3D object 218 for the living room environment, namely a floor lamp.

Figure 6C:
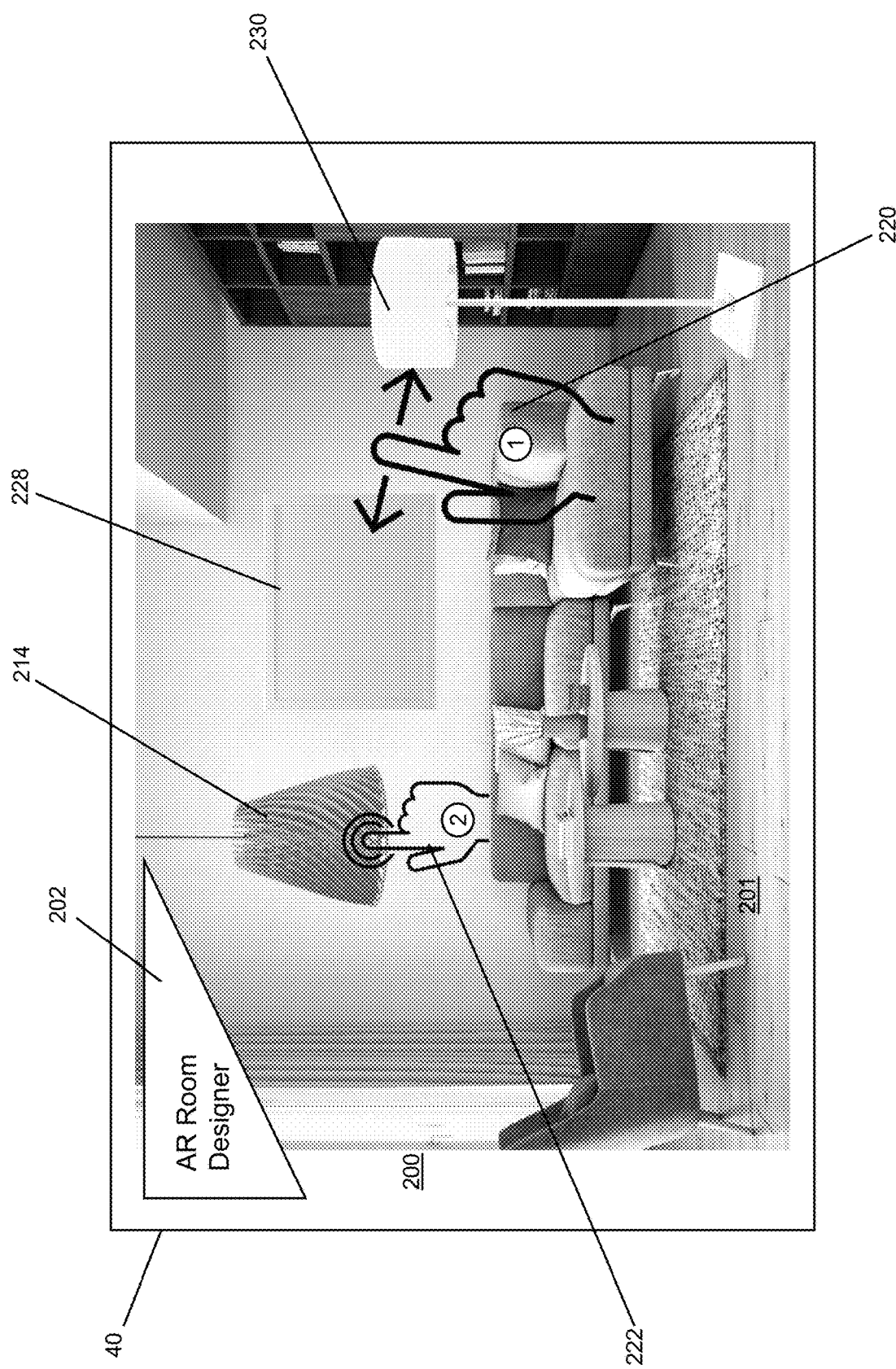
FIG. 6c shows the AR room designer UI following replacement of objects selected in the view shown in FIG. 6b.

In this example, a pair of gestures are illustrated using pictorial elements for ease of illustration. It can be appreciated that the gestures shown pictorially may be executed using different portions of a user's hand or be replaced by other inputs such as voice commands, menu selections, eye tracking, or field of view captures, to name a few. The first gesture 220 shown in FIG. 6b is depicted as a tap/touch gesture applied to the first replacement object 214, i.e., the hanging lamp. The second gesture 222 shown in FIG. 6b is depicted as a swipe gesture that is applied across or through the second replacement object 216 and the new 3D object 218, i.e., the framed mirror and the floor lamp. Multiple gestures can be used to selectively lock or unlock an item with the first gesture 220 and replace or keep other items with the second gesture 222. In this example, the first replacement object 214 is locked by applying the first gesture 220 such that by receiving the second gesture 222, that first replacement object 214 is not replaced with other suggested new 3D objects 24, while the second replacement object 216 and the new 3D object 218 would be replaced. In an alternative implementation, the first gesture 220 could be used to unlock the first replacement object 214 while the second gesture 220 is used to keep the other objects in the scene such that only the first replacement object 214 is replaced. The type of gesture used as a first input versus a second input can also vary. For example, the first gesture 220 could be used as a second input while the second gesture 222 could be used as the first input. That is, the type of input and the order in which the inputs are applied can vary to suit a particular application. To demonstrate the locking/unlocking and replacing/remaining interactive workflow, the following example continues with the first input (i.e., first gesture 220 in FIG. 6c) being used to lock one or more items with a second input (i.e., the second gesture 222 in FIG. 6c) being used to perform a replacement of either all remaining 3D objects 24 or a subset of all remaining objects 24 based on the gesture itself (e.g., all 3D objects 24 over/through which the swipe gesture passes). In FIG. 6c, therefore, the user wishes to keep the first replacement object 214 but wishes to see other replacements for the second replacement object 216 and the new 3D object 218.

Also shown in FIG. 6b are additional AR content elements that can be integrated into the AR room designer UI 200. For example, a product tag 224 is displayed in connection with the first replacement object 214. This product tag 224 can be displayed automatically or be displayed in response to an input such as a hover, tap or dwell directed at the associated 3D object 24. The product tag 224 can provide immediate information (such as the product name "Light1234" in this example). The product tag 224 can also provide a link to additional information such as a product page. The AR environment 201 can also include other AR elements such as an object viewer option 226. In FIG. 6b, the viewer option 226 seeks input from the user as to whether they wish to see more, i.e., one or more additional 3D objects 24. This option 226 can be used to allow the user to selectively add additional elements to the room being viewed and have the system determine appropriate additional 3D objects 24 to place in the scene, e.g., by using existing information or available metadata to determine an appropriate collection 26. For example, by selecting the object viewer option 226, the object viewer tool 12 can be provided with tags or product details for the 3D objects 24 already displayed and use such tags or product details to find a related collection 26 or another object, such as a coffee table or sofa, to be aligned with the currently viewed curation. In this way, the user can interactively broaden or narrow the extent of the curation by adding or removing 3D objects 24 to the scene.

Based on the inputs received in FIG. 6b, the object viewer tool 12 determines that the first replacement object 214 is locked in the current curation and determines appropriate replacement objects for the second replacement object 216 and the new 3D object 218. That is, the object viewer tool 12 determines an alternative for the framed mirror and the floor lamp, which can at least in part be based on characteristics or attributes of the first replacement object 214 that is locked in the next iteration. For example, the first replacement object 214 may be associated with multiple collections 26 and a next collection 26 can be selected based on a weighting factor or other metric that skews towards the user's affinity for the first replacement object 214.

Referring now to FIG. 6c, the AR environment 201 has been updated according to the first and second gestures 220, 222 received in FIG. 6b. As such, the first replacement object 214 remains, while a new second replacement object 228 is displayed in replacement of the second replacement object 216 (i.e., a different framed mirror) and a third replacement object 230 is displayed in replacement of the new 3D object 218 (i.e., a different floor lamp). As discussed earlier, the gestures used can vary depending on the scenario or application. In this example, the first gesture 220 corresponds to a swipe gesture across the new second replacement object 228 and the third replacement object 230 to lock those items and the second gesture 222 corresponds to a tap/touch applied to the first replacement object 214 to confirm a replacement to be applied to that item. In this way, the first replacement object 214 would be replaced by a new first replacement object 232 as seen in FIG. 6f and discussed in greater detail below.

Figure 6D:
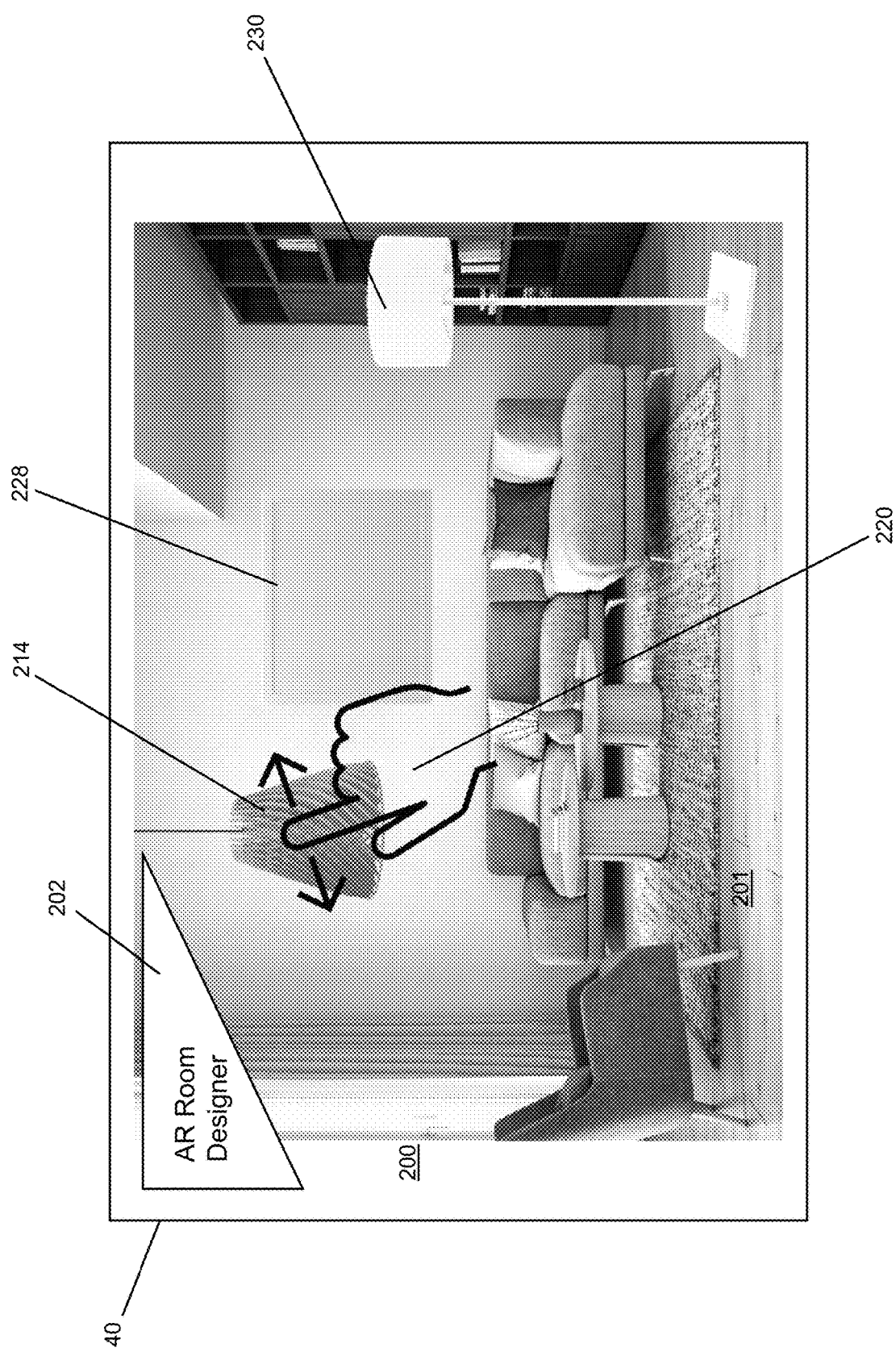
FIG. 6d shows the AR room designer UI as shown in FIG. 6c using another input type.
Figure 6E:
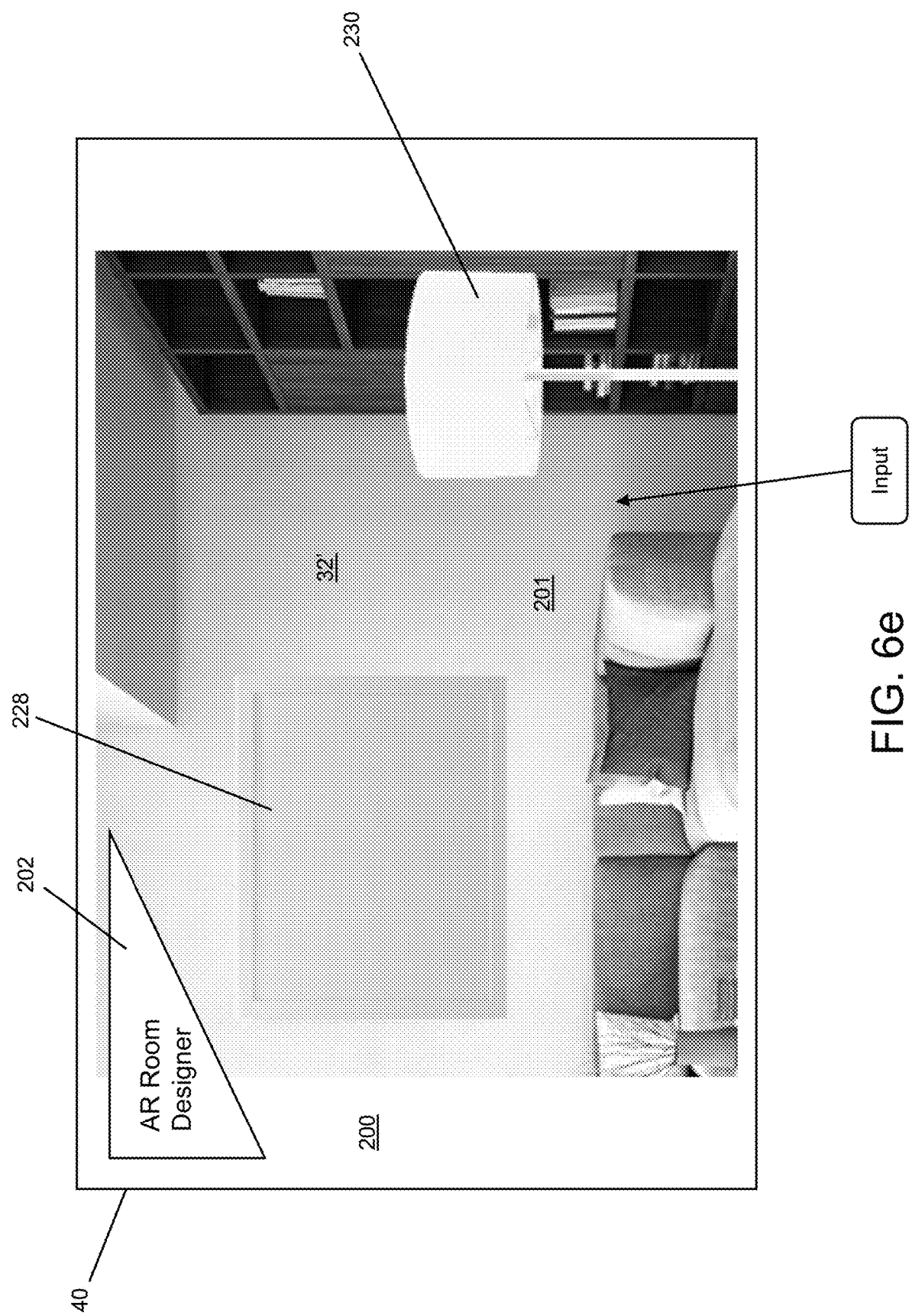
FIG. 6e shows the AR room designer UI as shown in FIGS. 6c and 6d using another input type that utilizes a zoomed-in field of view (FOV).

Returning to FIG. 6c, it is noted that the combination of inputs (i.e., first gesture 220 and second gesture 222) is illustrative of one example and various other combinations of one or more inputs are possible. For example, as shown in FIG. 6d, a single first gesture 220 could be used to imply that the new second replacement object 228 and the third replacement object 230 are to be kept (i.e., locked) while the first replacement object 214 is to be replaced by virtue of the type of gesture. Here, since a swipe gesture is applied across only the first replacement object 214, the object viewer tool 12 can infer that the first replacement object 214, namely the only object in the swiped path, is to be replaced. As such, it can be appreciated that a single gesture 220 can be used to invoke both locking and replacement according to the context and type of input. In another example, shown in FIG. 6e, a zoom action is used to capture only the new second replacement object 228 and the third replacement object 230 in the field of view 32 to effect the next input on only those objects. In this example, having these objects 228, 230 in the field of view implies that these objects are to be kept, while those outside of the field of view 32 (i.e., the first replacement object 214 in this example) are to be replaced. The opposite action could also be executed, wherein having these objects 228, 230 in the field of view 230 implies replacement of only those objects 228, 230. The input confirming the contents of the field of view 230 can vary, from a tap/touch, gesture, dwell time, voice command, etc. For example, a type of gesture can be used to determine whether to lock or replace the objects 24 in the field of view 32. Similarly, a voice command could directly instruct the object viewer tool 12 as to the intended action.

Figure 6F:
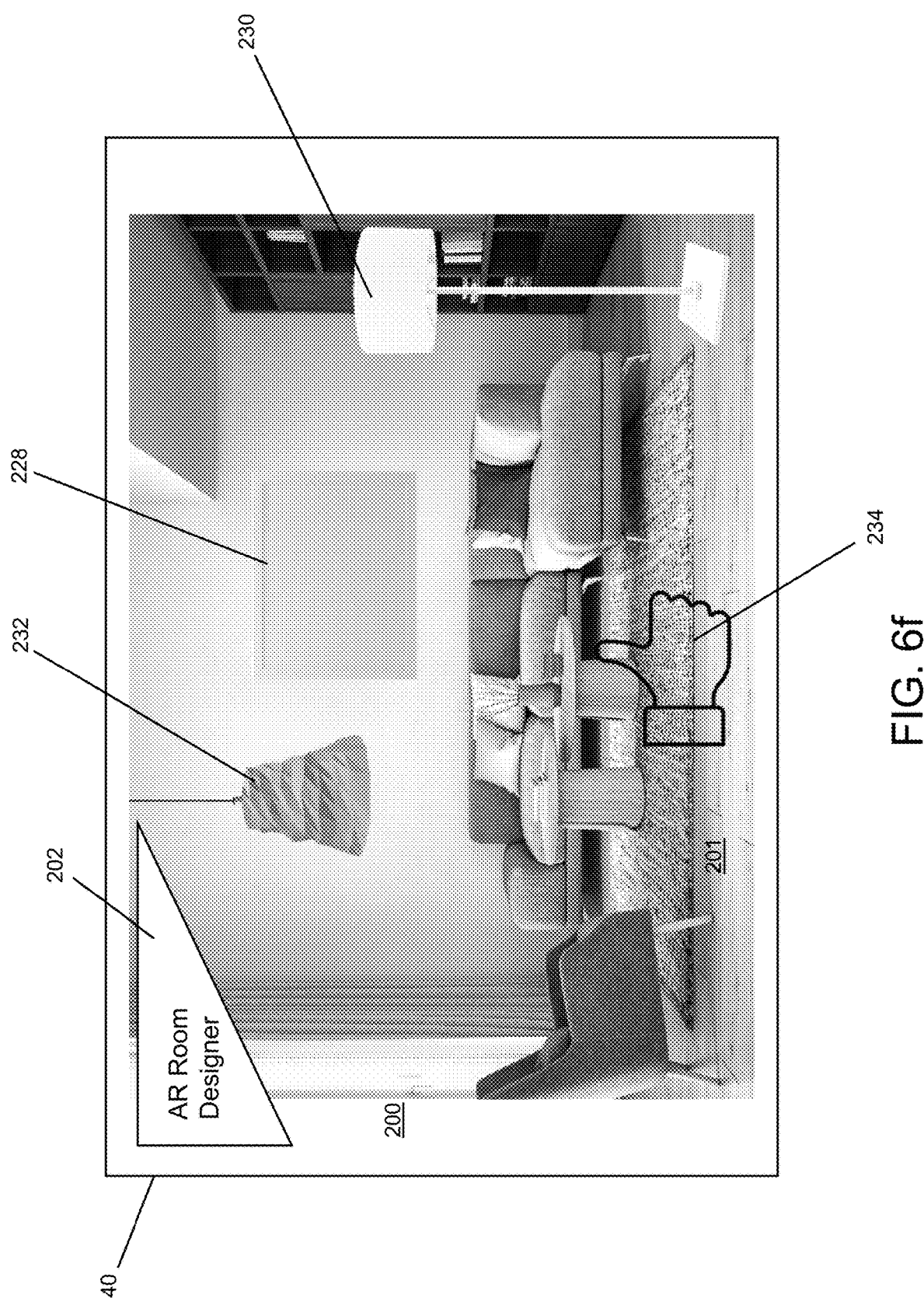
FIG. 6f shows the AR room designer UI in which a confirmation input is received.

FIG. 6f illustrates a further updated AR environment 201 in which a new first replacement object 232 is displayed in replacement of the first replacement object 214 (i.e., a new hanging lamp), while the new second replacement object 228 and the third replacement object 230 remain. In this example, a confirmation input 234, depicted using a "thumbs up" gesture, is used to effectively lock in all 3D objects 24 now showing in the scene to finalize the curation, project, session, etc. It can be appreciated that the thumbs up gesture 234 shown in FIG. 6f is illustrative only and other inputs could be used, such as tap/touch, voice commands, menu selections, etc.

Figure 7:
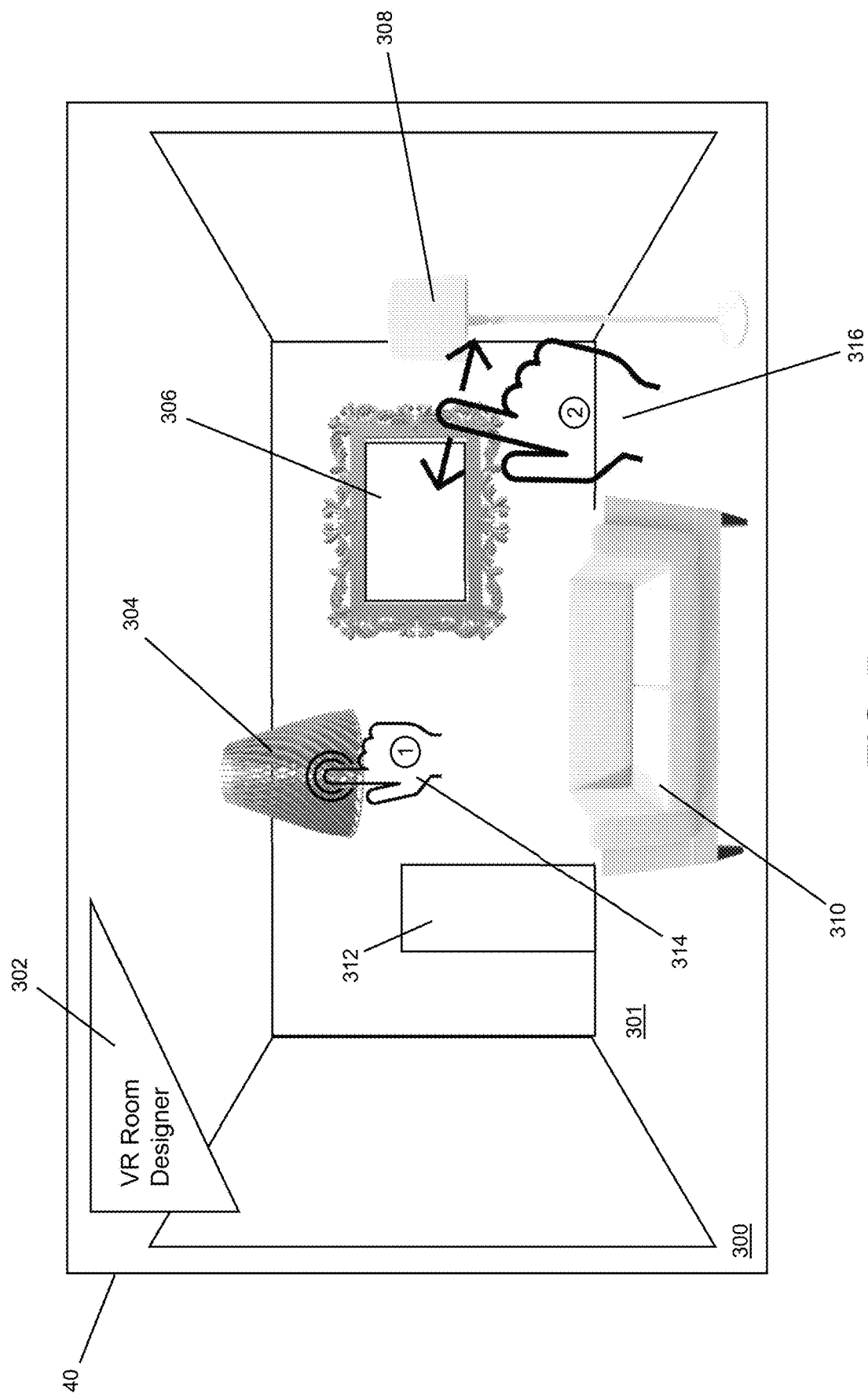
FIG. 7 shows an example of a VR room designer UI in which objects are selected for replacement.

Referring now to FIG. 7, similar principles are illustrated in a VR environment 301, in this example, a virtual room. As with the example in FIG. 6, a VR room designer UI 300 is displayed on an electronic display 40 and includes a VR Room Designer logo 302. In this example, the VR environment 301 includes a room having a couch 310 and a door 312. The couch 310 and door 312 in this example represent fixed VR elements in the VR environment 301 that for the purpose of illustration are meant to not be changed or curated. A first virtual object 304 is displayed, namely using a 3D model of hanging lamp as shown in FIG. 6. A second virtual object 306 is also displayed, using a 3D model of the framed mirror used by way of example in FIG. 6. A third virtual object 308 is also displayed, namely a 3D model of the initial floor lamp shown in FIG. 6. Since all elements in the VR environment 301 are virtual, all items could be displayed using 3D models with some fixed (as with the couch 310 and door 312) with others being interactive as with the first, second, and third virtual objects 304, 306, 308. The virtual objects 304-308 that are able to be locked and/or replaced may be displayed in a manner that is distinguishable from other elements in the VR environment 301 and this can be automatic or user selectable. For example, the VR environment 301 could be rendered with an initial set of virtual objects that can be locked and/or replaced, or a user can begin with a single item that is placed in the VR environment 301 and other items suggested thereafter.

Moreover, the VR environment 301 while providing a different experience than the AR environment 201 can have the same inputs such as the gestures illustrated in FIG. 6 applied in that environment. That is, the principles discussed with respect to the AR content and AR environment 201 can equally apply to the VR environment 301 while being adapted to the abilities and constraints that a completely virtual environment provides. For example, the VR environment 301 can include virtual users, virtual store clerks or other virtual items to interact with the user, as well as permit the user to interact with the objects, while using the VR room designer UI 302. On the other hand, the AR environment 201 can allow live camera feeds to permit real-world users to change, move or swap real-world items to complement the actions being taken with respect to the 3D objects 24 being rendered in the augmented fashion that is inherent in AR environments 201. In other words, the AR and VR environments 201, 301 may have features unique to the modality being used that can suit different applications more than others and thus provide unique embodiments and implementations of the principles discussed herein.

Figure 8A:
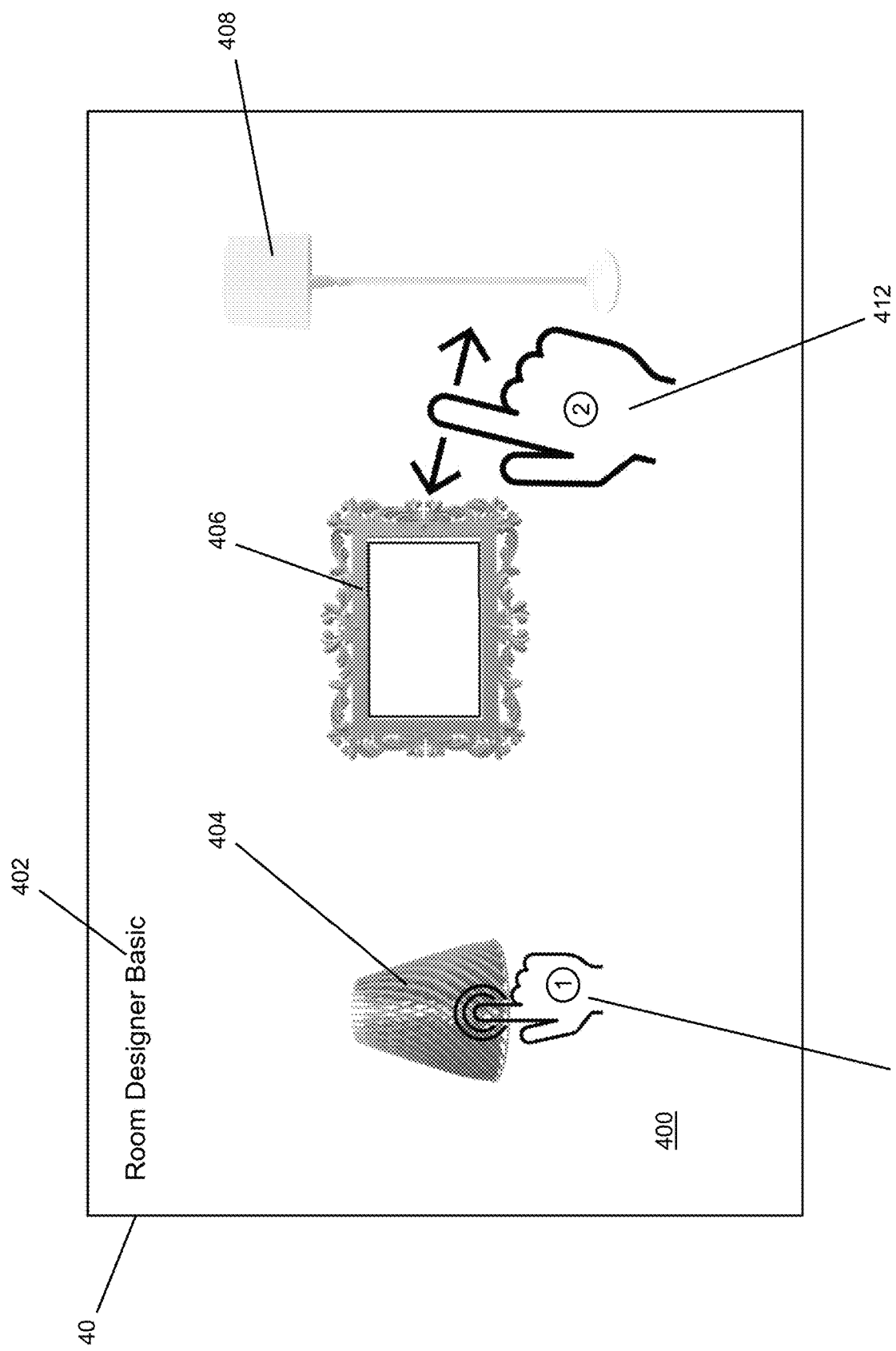
FIG. 8a shows an example of a 2D room designer UI in which objects are selected for replacement.

The locking/unlocking and replacing/remaining actions described above can also be applied to lower bandwidth environments such as traditional 2D UIs. FIG. 8a illustrates a 2D object viewer UI 400 that can be displayed on an electronic display 40, for example, via an app or web browser. In this example, the 2D object viewer UI 400 is denoted the Room Designer Basic per logo 402. The 2D object viewer UI 400 can provide a computing environment 10 in which the same principles of locking/unlocking and replacing/remaining can be applied to sets of 3D objects 24 rendered in the UI 400 whether or not in a scene or with a background, etc. For example, the 2D object viewer UI 400 could be presented as a preliminary shuffling or selection tool to find a starting point for viewing as a curation in an AR or VR environment 201, 301. In this example, a first 3D object 404 (hanging lamp from FIG. 6) is displayed alongside a second 3D object 406 (first framed mirror from FIG. 6), with a third 3D object 408 (first floor lamp from FIG. 6). The 2D environment afforded by the 2D object viewer UI 400 can also be used as the sole environment in which the locking/unlocking and replacing/remaining actions are applied. In this example, a first gesture 410 is applied to lock the first 3D object 404 (e.g., using a tap/touch as shown) and a second gesture 412 is applied to the second and third 3D objects 406, 408 to have those objects 406, 408 replaced.

Figure 8B:
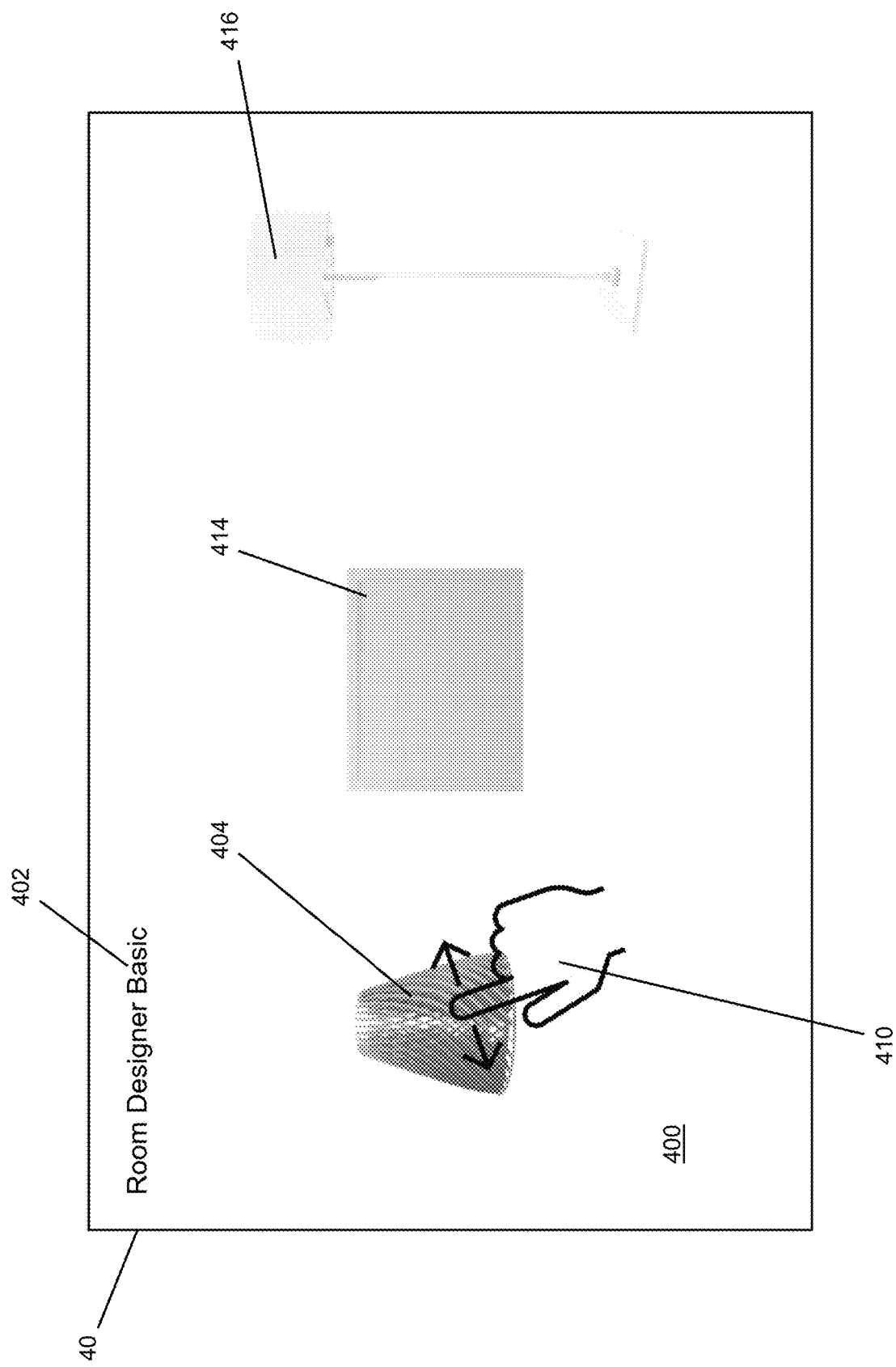
Figure 8C:
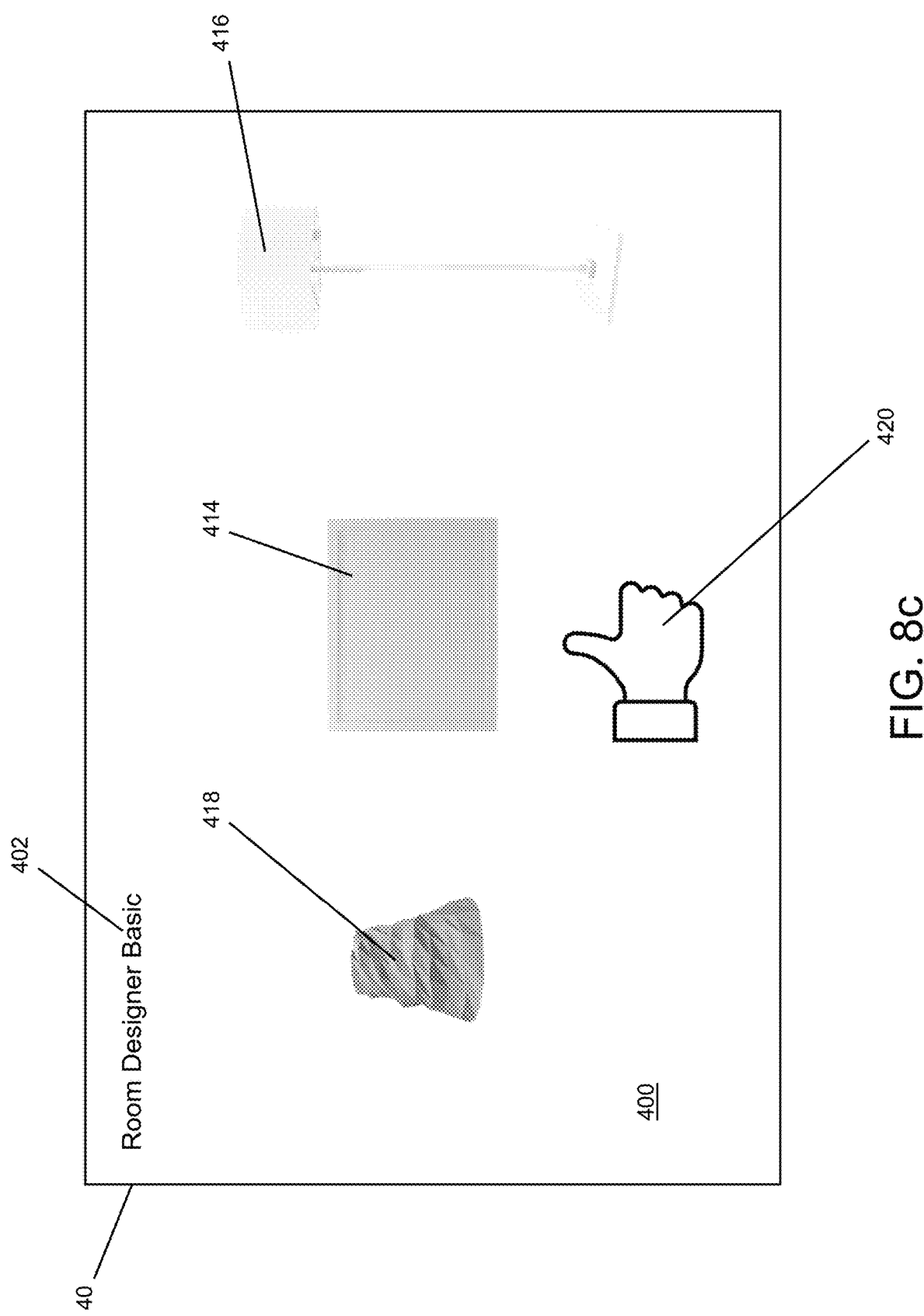
FIG. 8c shows the 2D room designer UI in which a confirmation input is received.

FIG. 8b shows the result of the gestures 410, 412 from FIG. 8a wherein a new second 3D object 414 is displayed in replacement of the second 3D object 406 and a new third 3D object 416 is displayed in replacement of the third 3D object 408. Similar to what is shown in FIG. 6d, a single gesture 410 can be applied to the first 3D object 404 to then apply a replacement to only that item, resulting in the set of objects shown in FIG. 8c in which a new first 3D object 418 is displayed in replacement of the first 3D object 404 while the new second and third 3D objects 414, 416 remain rendered in the 2D object viewer UI 400. As with FIG. 6f, a confirmation gesture 420 can be used to confirm the set of objects currently displayed. This confirmation gesture 420 can be used to trigger a subsequent action such as shifting to a new environment such as the AR environment 201 or VR environment 301 for further manipulations, or to proceed to a checkout mechanism in an e-commerce setting or confirm the contents of a project or design.

Figure 9:
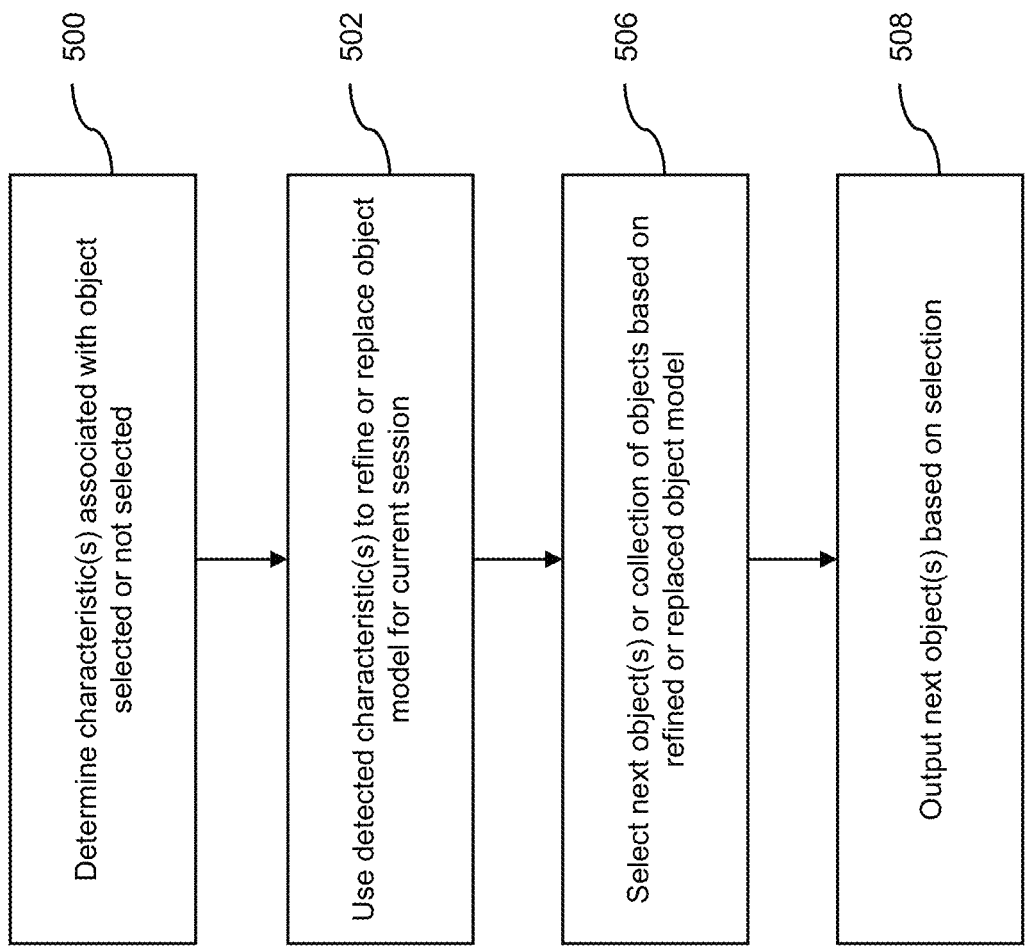
FIG. 9 is a flow chart illustrating an example set of computer executable instructions that can be executed for selecting next objects or collections of objects based on characteristics associated with objects selected or not selected.

Referring now to FIG. 9, a flow chart is provided illustrating example computer executable instructions that can be implemented in selecting a replacement 3D object 24 for a selected one that is to be replaced, e.g., as illustrated in the above examples. At block 500, the object viewer tool 12 determines one or more characteristics (or attributes or any other distinguishable feature or element, generally referred to herein as characteristics) that is/are associated with the object that has been selected (or not selected) and is to be replaced in the updated electronic content. For example, a tag or other metadata associated with either the item being replaced or one or more remaining items (or the surrounding environment) can be used to determine a product type, style, collection 26, etc. At block 502, the detected characteristic(s) can be used to refine or create/replace an object model for the current session. For example, the machine learning tool 28 can use existing object models or create a new object model that provide associations between the characteristics and 3D objects 24 available within the computing environment 10 to be used in iterating through the curations, e.g., as shown in FIGS. 6-8.

The object model can be a simple model with a table of characteristics that define a profile that is interpretable by the object viewer tool 12, or can be a more complex model used by the machine learning tool 28 to provide more sophisticated replacements based on additional intelligence, including training on real-world collections or other virtual collections 26. At block 506, the next object(s) 24 or a new collection 26 of objects is/are selected based on the refined or replaced object model and the next object(s) is/are output based on the selection at block 508. In this way, the object viewer tool 12 can leverage the processing capabilities and intelligence provided by other tools such as the machine learning tool 28 to provide increasingly accurate and desirable recommendations to the user as they utilize the object viewer tool 12 in different settings. The machine learning tool 28 can be proprietary to the computing environment 10 in which the object viewer tool 12 operates or can be a standalone service that provides deeper insights by building and refining models for multiple computing environments over time.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 10:
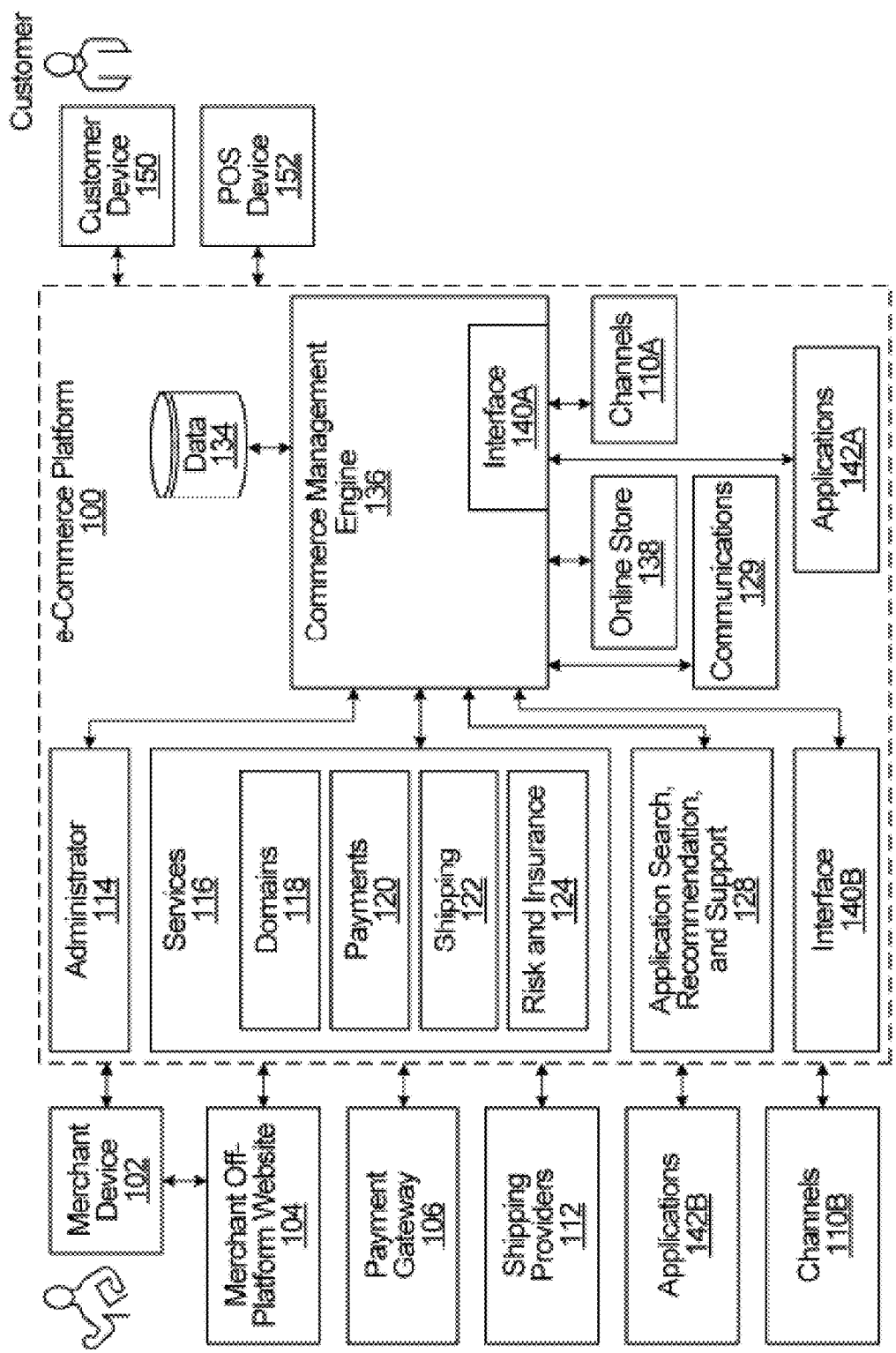
FIG. 10 is a block diagram illustrating an example of a configuration for an e-commerce platform.

FIG. 10 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 10, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 11:
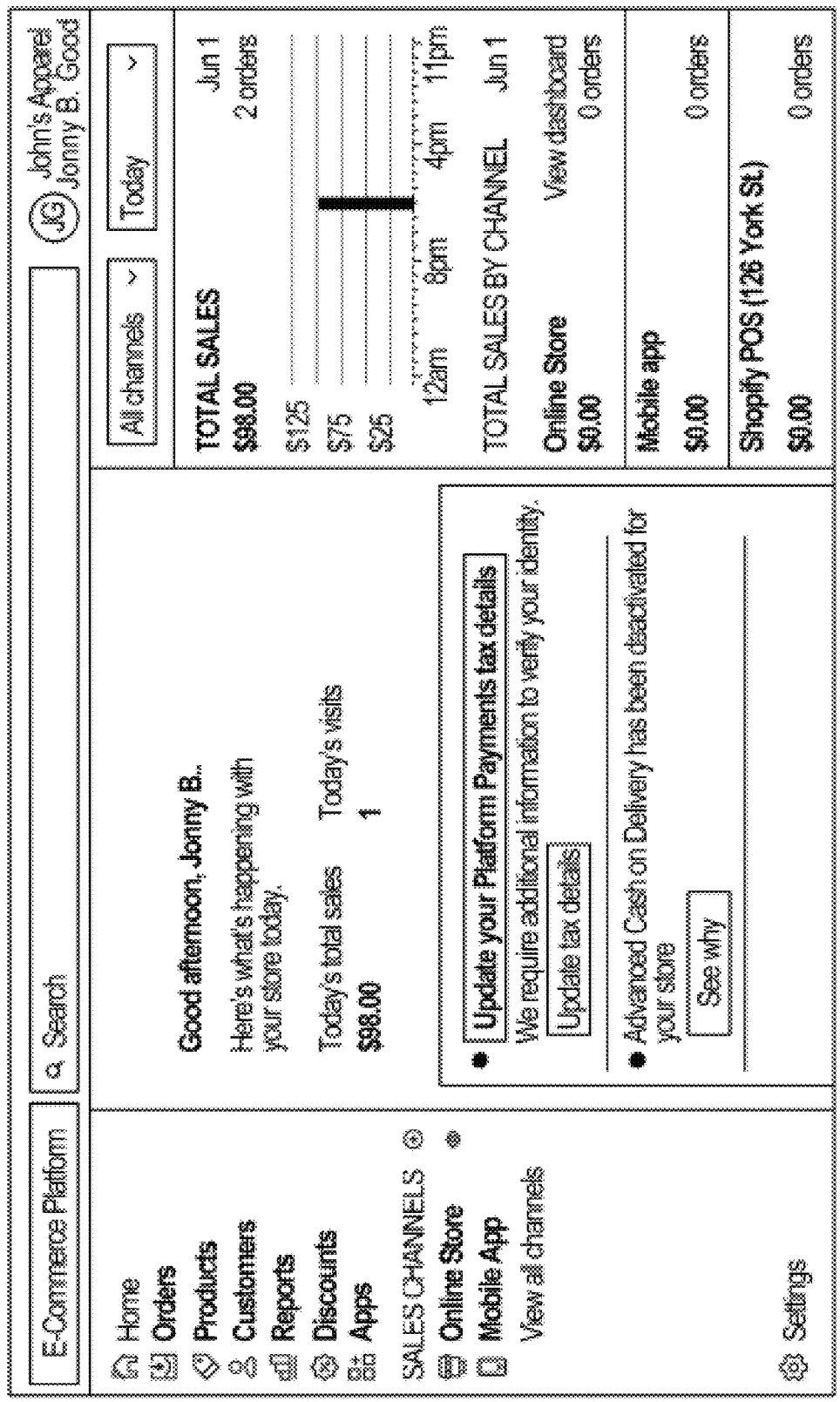
FIG. 11 shows an example of a UI for interacting with the e-commerce platform shown in FIG. 10.

FIG. 11 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 11. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 10, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a UI (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the UI of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (Representational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example), to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation in an E-Commerce Platform

Figure 12:
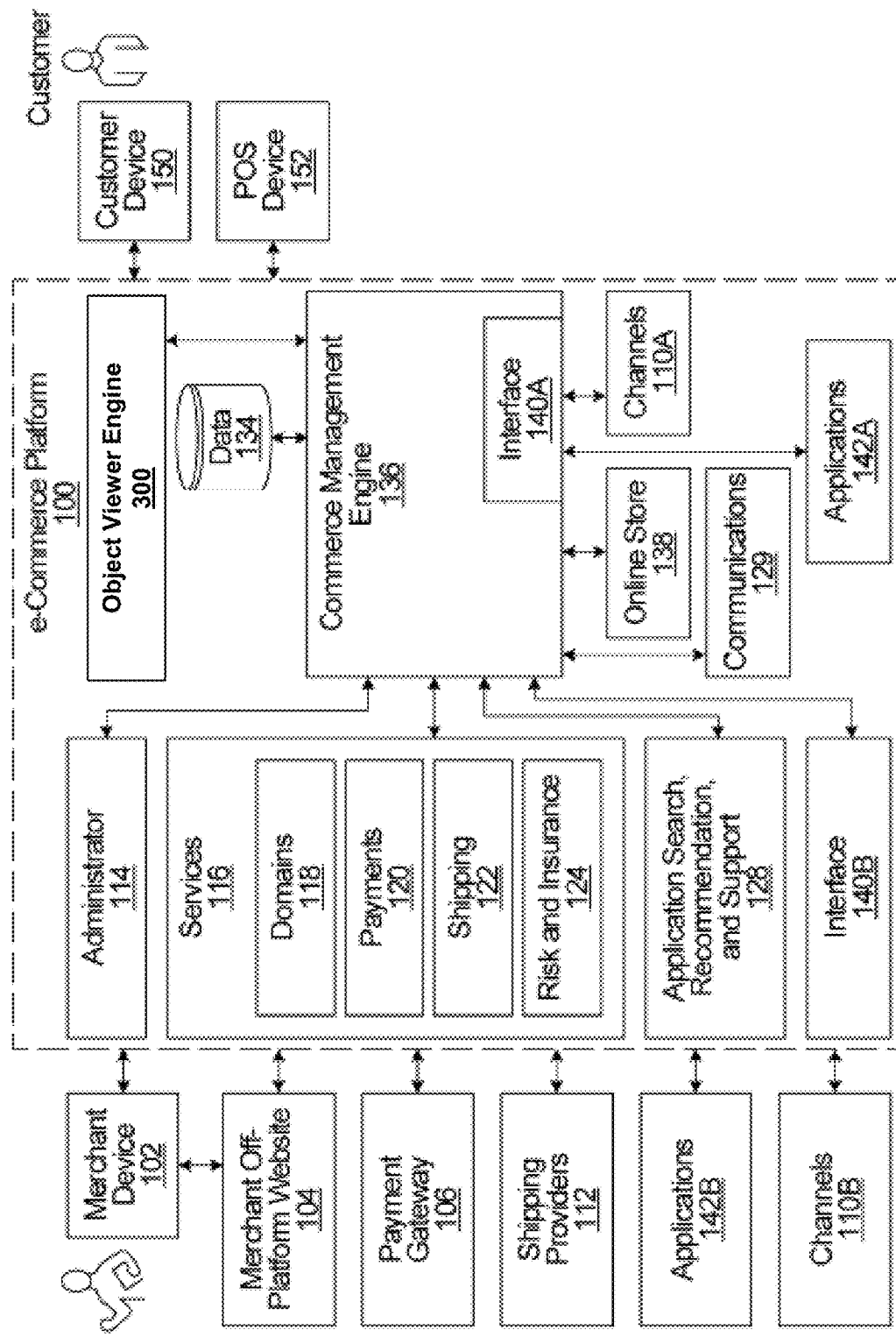
FIG. 12 is a block diagram illustrating an example of the e-commerce platform of FIG. 10 with an object viewer engine.

The functionality described herein may be used in commerce to provide improved customer or buyer experiences. The e-commerce platform 100 could implement the functionality for any of a variety of different applications, examples of which are described elsewhere herein. FIG. 12 illustrates the e-commerce platform 100 of FIG. 10 but including an object viewer engine 300. The engine 300 is an example of a computer-implemented system that implements the functionality described herein for use by the e-commerce platform 100, the customer device 150 and/or the merchant device 102.

Although the engine 300 is illustrated as a distinct component of the e-commerce platform 100 in FIG. 12, this is only an example. An engine could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides that engine. However, the location of the engine 300 is implementation specific. In some implementations, the engine 300 is provided at least in part by an e-commerce platform, either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application. The e-commerce platform 100 can therefore be considered an example of a computing environment 10 in which the virtual photoshoot application 12 is implemented as an engine 300, coupled to the commerce management engine 136 and/or interface 140B to enable the object viewer functionality to be integrated into a UI displayed to the merchant device 102, the customer device 150, or both.

As discussed in further detail below, the engine 300 could implement at least some of the functionality described herein. Although the embodiments described below may be implemented in association with an e-commerce platform, such as (but not limited to) the e-commerce platform 100, the embodiments described below are not limited to e-commerce platforms.

Example E-Commerce User Interfaces

Figure 14:
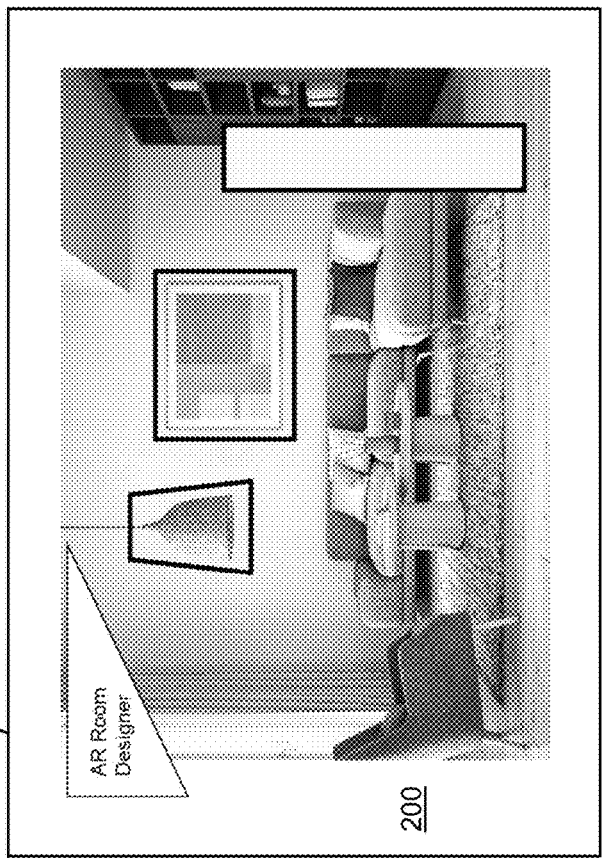
FIG. 14 shows an example of the AR room designer UI launched from the product page shown in FIG. 13.
Figure 13:
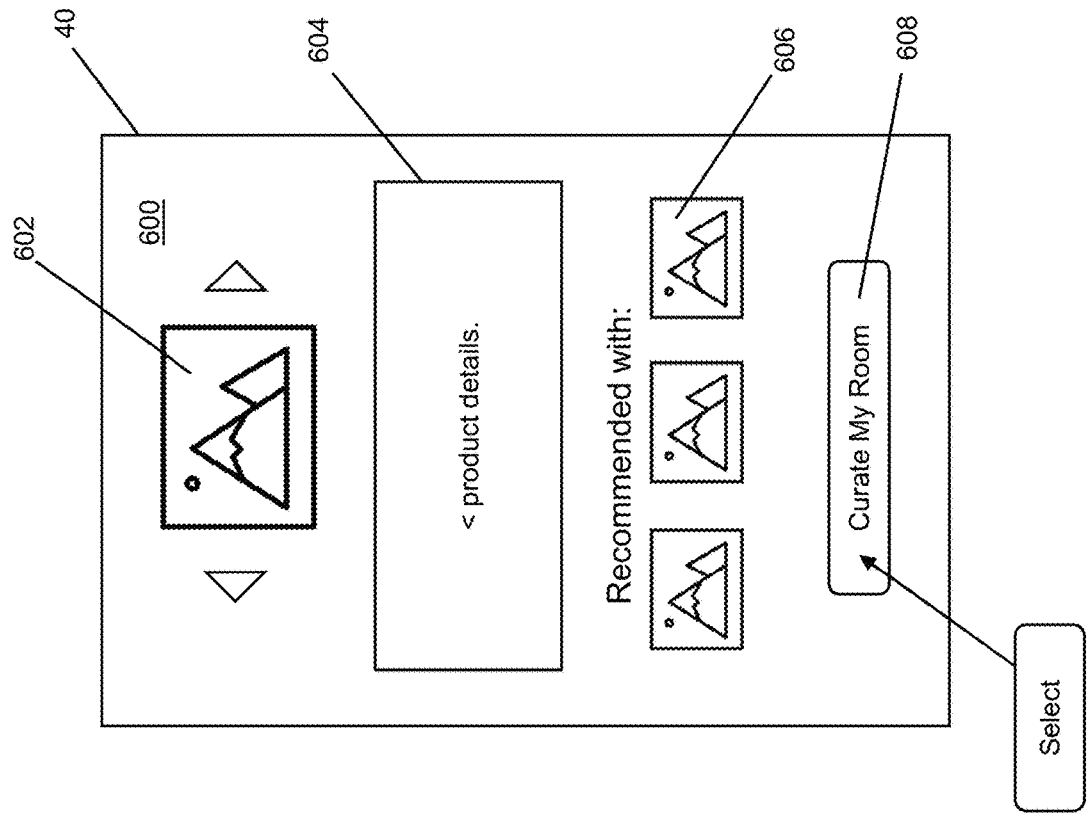
FIG. 13 shows an example of a UI for previewing a product page with a set of images recommended with the product and an option to curate a room using a room designer UI.

Referring now to FIG. 13, an example of a UI 600 that is particularly suitable to an e-commerce or other web- or app-based product details page is shown. The product page UI 600 may be displayed on an electronic display 40. The UI 600 in this example includes a set of photos 602 that can be scrolled through by the user (e.g., as a slider or slideshow). The UI 600 also includes a product details pane 604 that can be used to provide product details, for example in an online storefront or catalogue of products. In this example, the UI 600 includes a set of recommended products 606 that are displayed below the product details pane 604, which can be used by the engine 300 to suggest other related items to the user, for example, other products that are included in a same collection 26 as the product featured in the UI 600 and currently being viewed. To integrate the object viewer tool 12 into the e-commerce platform 100, a Curate My Room option 608 is provided, which can be selected as shown in FIG. 13 to launch the AR room designer UI 200 as illustrated in FIG. 14. That is, the AR room designer UI 200 can be integrated into an e-commerce platform 100 to provide a room designing feature that can be accessed through a product details page or other e-commerce website page to allow the user to view the products of interest in their own space. It can be appreciated that the VR room designer UI 300 and Room designer basic UI 400 could also be integrated into the e-commerce platform 100 as illustrated herein.

FIG. 15 illustrates the execution of the completion gesture 234, which in this example causes a checkout icon 608 to appear in the AR room designer UI 200. This checkout icon 608 can be selected as shown to select the products associated with the confirmed 3D objects 24 in the curation as items to be purchased, thus launching a checkout page 610 as shown in FIG. 16. The checkout page 610 includes a list 612 of items with associated photos 614 and product labels 616 as is typically provided in a checkout mechanism. The checkout page 610 can identify items from the curation or can simply include them without any distinguishing markings or identifiers. A Purchase button 618 can be selected to then initiate a transaction involving the items selected in part using the object viewer tool 12.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10 or e-commerce platform 100 and/or object viewer engine 300, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method comprising:
presenting augmented reality (AR) content in a scene, the presented AR content showing a set of objects in the scene, at least some of the objects of the set of objects being rendered 3D objects;
receiving a first input identifying a first object of the set of objects in the scene; and
responsive to receiving a second input, providing updated AR content in the scene based on the first input and the second input, the updated AR content keeping either the first object or at least one other object of the set of objects while replacing the other of the first object or the at least one other object of the set of objects with at least one different rendered 3D object, wherein the at least one different rendered 3D object is determined based on the identified first object of the set of objects in the scene.

2. The method of claim 1, wherein the second input comprises a swipe gesture.

3. The method of claim 1, wherein the first input is one of a lock input and an unlock input.

4. The method of claim 1, wherein the at least one different rendered 3D object replaces the first object of the set of objects.

5. The method of claim 1, wherein the at least one different rendered 3D object replaces the at least one other object of the set of objects.

6. The method of claim 1, wherein the at least one different rendered 3D object comprises at least one new rendered 3D object.

7. The method of claim 1, wherein a position of the at least one different rendered 3D object is offset from a particular location of the first object or the at least one other of the objects.

8. The method of claim 1, wherein one or more of the at least one different rendered 3D object or at least one remaining rendered 3D object comprises a rendered indication of a selected real-world object.

9. The method of claim 8, wherein the rendered indication of the selected real-world object is displayed as an overlay in the updated AR content.

10. The method of claim 1, comprising:
prior to presenting the AR content showing the set of objects:
receiving an input in a first environment identifying an object from a set of objects rendered in the field of view of the user device;
generating new content in the first environment including: an updated object from the set; and at least one remaining object from the set; and
transitioning to a second environment comprising the AR content.

11. The method of claim 10, wherein the first environment is a two-dimensional user interface displaying the set of objects.

12. The method of claim 1, wherein the first input comprises a swipe gesture that identifies the first object of the set of objects.

13. The method of claim 1, wherein the first input comprises identifying the first object of the set of objects based on a zoomed field of view in the AR content.

14. The method of claim 1, comprising using the first input to determine a replacement object as the different rendered 3D object, for the new AR content.

15. The method of claim 14, wherein the first input is used to determine at least one characteristic found in the replacement object.

16. The method of claim 1, comprising:
repeating the method to identify a different one of the set of objects or identify an additional one of the set of objects; and
further updating the AR content based on the repeating.

17. The method of claim 1, comprising:
receiving a third input confirming a desired set of objects in the updated AR content; and
executing an action associated with the desired set of objects.

18. The method of claim 17, wherein the action comprises a retail checkout mechanism.

19. A system comprising:
a processor;
at least one communications module to communicate with an input module of a user device; and
at least one memory, the at least one memory comprising computer executable instructions that, when executed by the at least one processor, causes the system to:
present augmented reality (AR) content in a scene, the presented AR content showing a set of objects in the scene, at least some of the objects of the set of objects being rendered 3D objects;
receive a first input identifying a first object of the set of objects in the scene; and
responsive to receiving a second input, provide updated AR content in the scene based on the first input and the second input, the updated AR content keeping either the first object or at least one other object of the set of objects while replacing the other of the first object or the at least one other object of the set of objects with at least one different rendered 3D object, wherein the at least one different rendered 3D object is determined based on the identified first object of the set of objects in the scene.

20. The system of claim 19, wherein the second input comprises a swipe gesture.

21. The system of claim 19, wherein the at least one different rendered 3D object replaces the first object of the set of objects.

22. The system of claim 19, wherein the at least one different rendered 3D object replaces the at least one other object of the set of objects.

23. A non-transitory computer readable medium comprising computer executable instructions that when executed by a processor, cause the processor to execute instructions for:
presenting augmented reality (AR) content in a scene, the presented AR content showing a set of objects in the scene, at least some of the objects of the set of objects being rendered 3D objects;
receiving a first input identifying a first object of the set of objects in the scene; and
responsive to receiving a second input, providing updated AR content in the scene based on the first input and the second input, the updated AR content keeping either the first object or at least one other object of the set of objects while replacing the other of the first object or the at least one other object of the set of objects with at least one different rendered 3D object, wherein the at least one different rendered 3D object is determined based on the identified first object of the set of objects in the scene.

* * * * *